(12) United States Patent
Sakai et al.

(10) Patent No.: US 10,618,528 B2
(45) Date of Patent: Apr. 14, 2020

(54) DRIVING ASSISTANCE APPARATUS

(71) Applicant: MITSUBISHI ELECTRIC CORPORATION, Tokyo (JP)

(72) Inventors: Yuki Sakai, Tokyo (JP); Yuji Karita, Tokyo (JP); Mitsuo Shimotani, Tokyo (JP); Satoru Inoue, Tokyo (JP); Yoshio Sato, Tokyo (JP); Tadashi Miyahara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 170 days.

(21) Appl. No.: 15/754,852

(22) PCT Filed: Oct. 30, 2015

(86) PCT No.: PCT/JP2015/080750
§ 371 (c)(1),
(2) Date: Feb. 23, 2018

(87) PCT Pub. No.: WO2017/072956
PCT Pub. Date: May 4, 2017

(65) Prior Publication Data
US 2018/0244286 A1   Aug. 30, 2018

(51) Int. Cl.
*B60W 50/10*   (2012.01)
*B60W 50/14*   (2020.01)
(Continued)

(52) U.S. Cl.
CPC ............. *B60W 50/10* (2013.01); *B60K 35/00* (2013.01); *B60K 37/06* (2013.01); *B60R 1/00* (2013.01);
(Continued)

(58) Field of Classification Search
None
See application file for complete search history.

(56) References Cited

U.S. PATENT DOCUMENTS 9,354,073 B2 * 5/2016 Censo ............... G01C 21/3626
2009/0118900 A1   5/2009 Adachi et al.
(Continued)

FOREIGN PATENT DOCUMENTS

JP   10-86698 A    4/1998
JP   2006-172215 A   6/2006
(Continued)

OTHER PUBLICATIONS

Japanese Office Action dated Jun. 21, 2018, issued in corresponding Japanese Application No. 2017-547318.
(Continued)

*Primary Examiner* — Dale W Hilgendorf
*Assistant Examiner* — Alexander C. Bost
(74) *Attorney, Agent, or Firm* — Birch, Stewart, Kolasch & Birch, LLP

(57) ABSTRACT

An object is to provide a technique which enables a driver to intuitively select and determine a target object to which a vehicle is to travel. A driving assistance apparatus includes a candidate selection unit which selects a target object candidate when the candidate selection unit determines that a visual line position of a driver is included in any setting range of a plurality of target object candidates and a target object determination unit which determines the target object candidate selected by the candidate selection unit as a target object when a determination button which can be operated by the driver is operated after the candidate selection unit selects the target object candidate.

14 Claims, 23 Drawing Sheets

(51) Int. Cl.

| | |
|---|---|
| *B60W 30/06* | (2006.01) |
| *B60K 35/00* | (2006.01) |
| *B60K 37/06* | (2006.01) |
| *B60W 30/14* | (2006.01) |
| *B60R 1/00* | (2006.01) |
| *G02B 27/01* | (2006.01) |
| *G06F 3/01* | (2006.01) |
| *G06F 3/16* | (2006.01) |
| *G06K 9/00* | (2006.01) |

(52) U.S. Cl.
CPC ............ *B60W 30/06* (2013.01); *B60W 30/14* (2013.01); *B60W 50/14* (2013.01); *G02B 27/0179* (2013.01); *B60K 2370/149* (2019.05); *B60K 2370/199* (2019.05); *B60K 2370/21* (2019.05); *B60R 2300/205* (2013.01); *B60R 2300/806* (2013.01); *B60W 2050/146* (2013.01); *B60W 2540/00* (2013.01); *B60W 2550/10* (2013.01); *G02B 2027/0187* (2013.01); *G06F 3/013* (2013.01); *G06F 3/165* (2013.01); *G06K 9/00812* (2013.01)

(56) References Cited

U.S. PATENT DOCUMENTS

| | | |
|---|---|---|
| 2010/0049375 A1 | 2/2010 | Tanimoto |
| 2012/0224060 A1* | 9/2012 | Gurevich .................. B60R 1/00 348/148 |
| 2013/0144492 A1 | 6/2013 | Takano et al. |
| 2014/0278033 A1* | 9/2014 | Scofield ................ G02B 27/01 701/118 |
| 2015/0062168 A1* | 3/2015 | Ng-Thow-Hing ..... G02B 27/01 345/633 |
| 2015/0175068 A1* | 6/2015 | Szostak .................. B60K 35/00 340/435 |
| 2015/0235398 A1* | 8/2015 | Kim ........................ G06F 3/011 345/633 |
| 2016/0012274 A1* | 1/2016 | Chen .................... G06K 9/0061 382/103 |
| 2016/0052394 A1* | 2/2016 | Yamada ................. B60K 37/04 701/93 |
| 2016/0054795 A1* | 2/2016 | Sasaki ..................... G06F 3/013 345/642 |
| 2016/0120403 A1* | 5/2016 | Mochizuki ............. A61B 3/024 351/209 |
| 2016/0163108 A1* | 6/2016 | Kim .................. G02B 27/0101 345/633 |
| 2016/0170485 A1 | 6/2016 | Naruse |
| 2016/0284217 A1* | 9/2016 | Lee ......................... G08G 1/143 |
| 2017/0053444 A1* | 2/2017 | Huang .................. G06T 19/006 |
| 2017/0084176 A1* | 3/2017 | Nakamura ............... G06T 7/70 |
| 2017/0161009 A1* | 6/2017 | Ogisu .................... B60K 35/00 |
| 2018/0090007 A1* | 3/2018 | Takemori ........... G06K 9/00671 |

FOREIGN PATENT DOCUMENTS

| | | |
|---|---|---|
| JP | 2007-099199 A | 4/2007 |
| WO | WO 2007/058325 A1 | 5/2007 |
| WO | WO 2008/136456 A1 | 11/2008 |
| WO | WO 2011/155464 A1 | 12/2011 |
| WO | WO 2014/181543 A1 | 11/2014 |

OTHER PUBLICATIONS

Fukaya, "The Technical Trend of Sensors for Automobiles", Denso Technical View, 2006, vol. 11, No. 1, pp. 92-99.
International Search Report, issued in PCT/JP2015/080750, dated Jan. 26, 2016.

* cited by examiner

F I G . 1
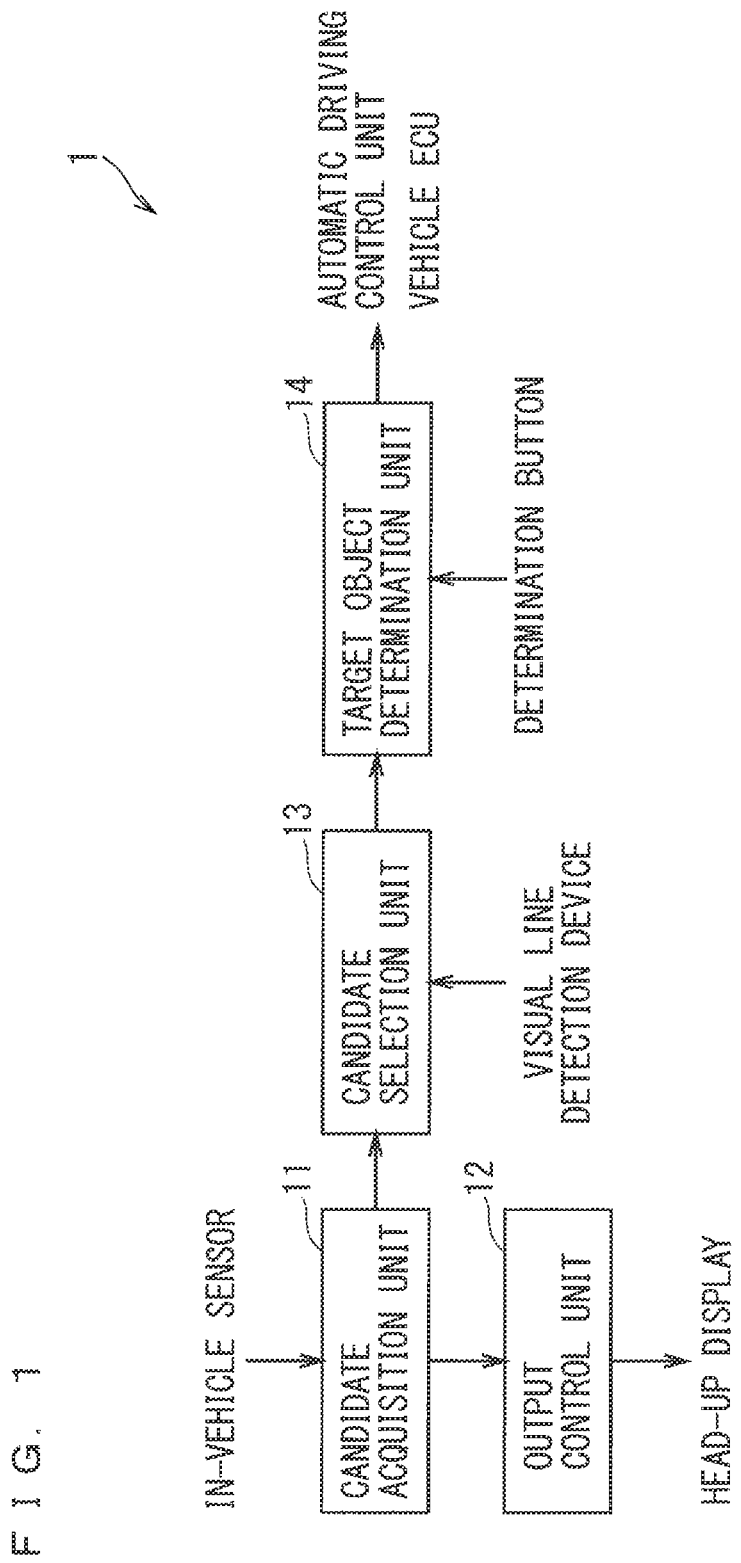

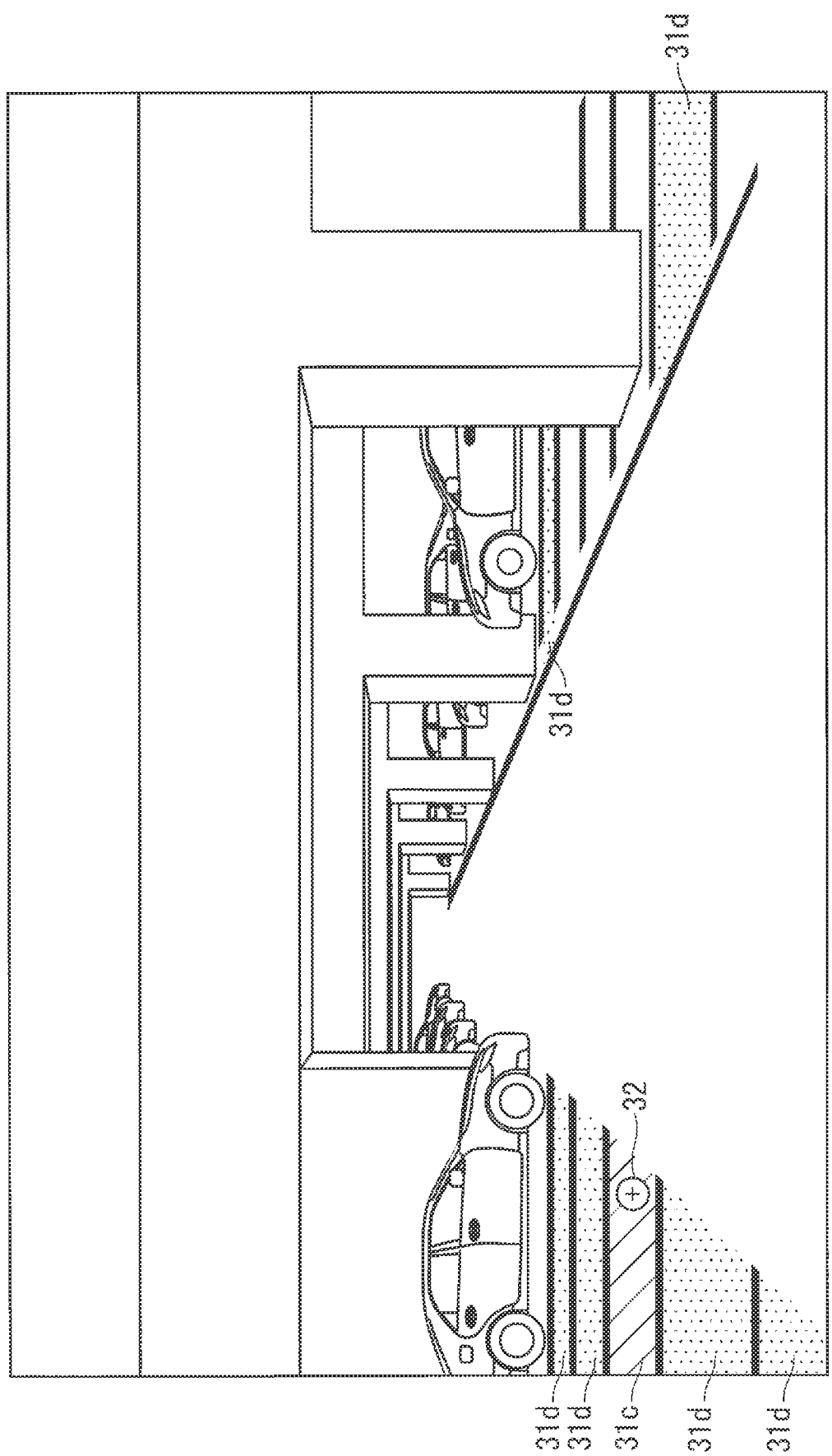

F I G. 1 7
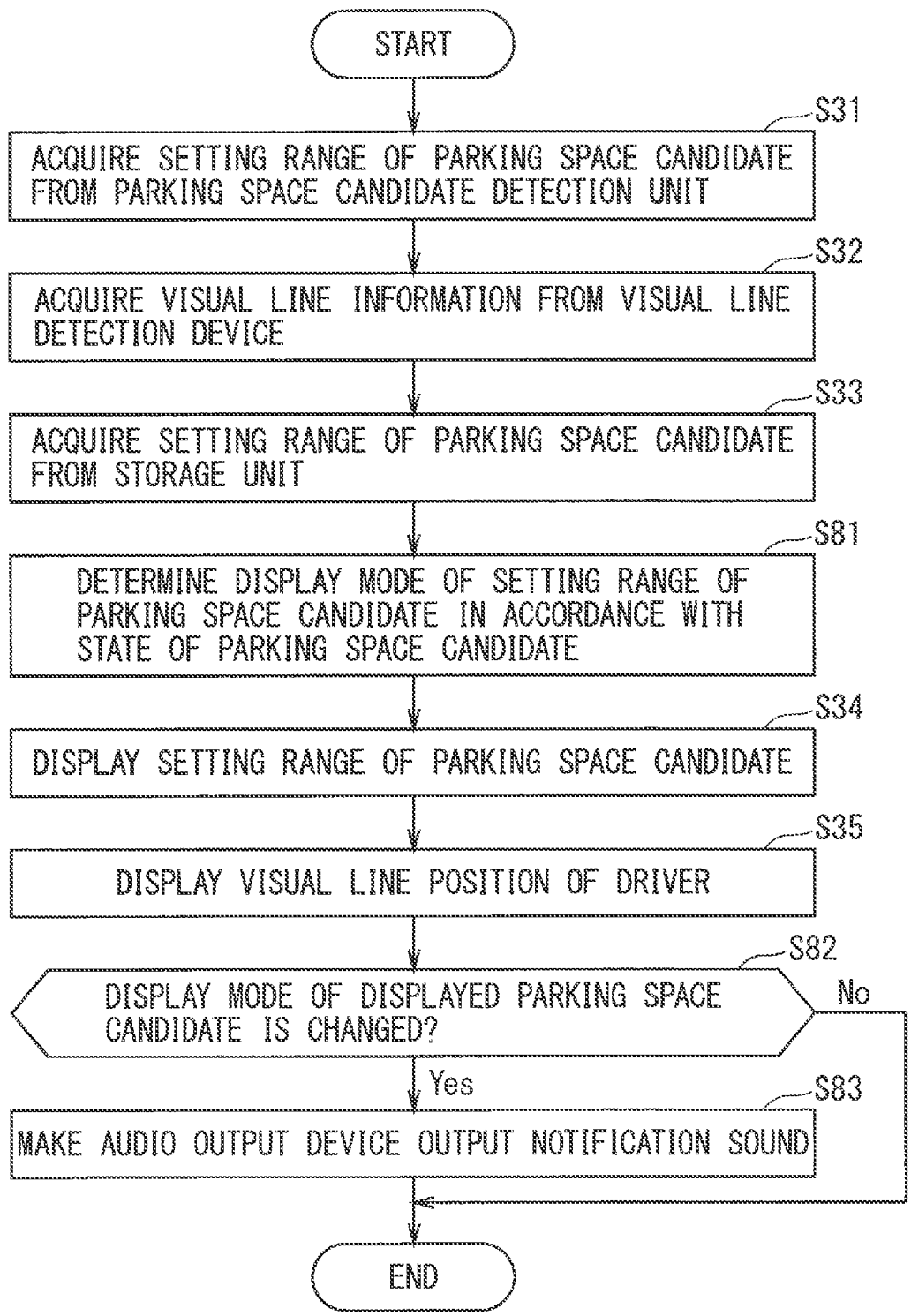

F I G. 29
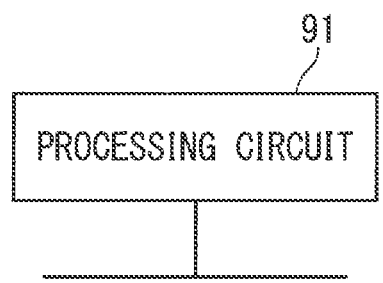
F I G. 30
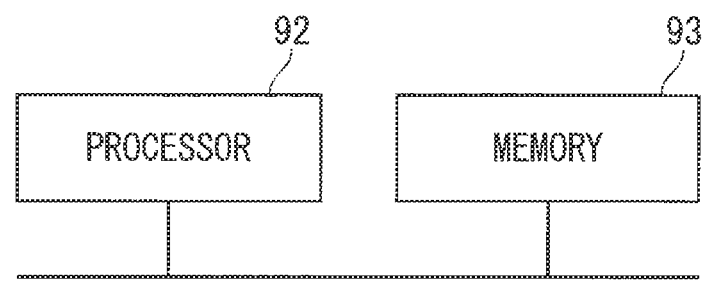

DRIVING ASSISTANCE APPARATUS

TECHNICAL FIELD

The present invention relates to a driving assistance apparatus for assisting a driving of a vehicle which is capable of performing an automatic driving.

BACKGROUND ART

Conventionally developed is a driving assistance apparatus providing a function of assisting a drive operation at a time of driving a vehicle such as an automatic brake in accordance with an obstacle detection to achieve a smooth parking. Excepted in the future is that the driving assistance apparatus substitutionally performs all or part of the drive operation of a driver, in anticipation of a complete automatic driving, to reduce a driving load of the driver. It is important in such a driving assistance apparatus to appropriately transmit an intention of the driver to the driving assistance apparatus so that a smooth driving assistance is achieved.

Proposed as one of the functions of the automatic driving is an automatic parking function of automatically parking the vehicle in a parking space. For example, Patent Document 1 discloses a technique of selecting a parking mode based on a steering angle of a steering wheel in a case where a driver selects the parking mode from among a plurality of parking modes in an automatic driving. Patent Document 2 discloses a driving assistance technique of detecting a visual line of a driver to supplement a control of steering angle in a direction intended by the driver.

Also proposed as one of the functions of the automatic driving is an automatic following function of making a vehicle automatically follow a non-subject vehicle.

PRIOR ART DOCUMENTS

Patent Documents

Patent Document 1: International Publication No. 2011/155464
Patent Document 2: International Publication No. 2008/136456

SUMMARY

Problem to be Solved by the Invention

However, the technique described in Patent Document 1 has a problem that when a steering wheel is rotated too much, an operation of returning the steering angle of the steering wheel is necessary, thereby troubling the driver. The technique described in Patent Document 2 enables the driver to indicate a desired traveling direction with the visual line, but has a problem that it cannot be applied to a method of selecting and determining a desired parking space after comparing a plurality of parking spaces. A problem similar to that in the automatic parking function also occurs in a case of applying the techniques described in Patent Document 1 and Patent Document 2 to the automatic following function.

The present invention therefore has been made to solve problems as described above, and it is an object of the present invention to provide a technique which enables a driver to intuitively select and determine a target object to which a vehicle is to travel.

Means to Solve the Problem

A driving assistance apparatus according to the present invention is a driving assistance apparatus for assisting a driving of a vehicle which is capable of performing an automatic driving including: a candidate acquisition unit which acquires at least one target object candidate, which is a candidate for a target object to which the vehicle is to travel and detected based on periphery information regarding a periphery of the vehicle; an output control unit which makes a head-up display mounted on the vehicle display a setting range being set for each of the plurality of target object candidates acquired by the candidate acquisition unit; a candidate selection unit which selects one target object candidate when it is determined, based on visual line information regarding a visual line of the driver of the vehicle, that a visual line position of the driver is included in the setting range of the one target object candidate among the setting ranges of the plurality of target object candidates; and a target object determination unit which determines the target object candidate selected by the candidate selection unit as the target object when a determination button which can be operated by the driver is operated after the candidate selection unit selects the target object candidate. The target object determination unit outputs the determined target object to an automatic driving control unit which can control the automatic driving of the vehicle so that the vehicle travels to the determined target object. The output control unit changes a display mode of the setting range of the target object candidate displayed by the head-up display based on a timing of acquiring the target object candidate in the candidate acquisition unit.

Effects of the Invention

The present invention includes a candidate selection unit which selects one target object candidate when the candidate selection unit determines, based on visual information regarding a visual line of a driver of a vehicle, that a visual line position of the driver is included in a setting range of the one target object candidate among a plurality of target object candidates and a target object determination unit which determines the target object candidate selected by the candidate selection unit as a target object when a determination button which can be operated by the driver is operated after the candidate selection unit selects the target object candidate. Accordingly, the driver can intuitively select and determine the target object to which the vehicle is to travel among the target object candidates.

These and other objects, features, aspects and advantages of the present invention will become more apparent from the following detailed description of the present invention when taken in conjunction with the accompanying drawings.

BRIEF DESCRIPTION OF DRAWINGS

FIG. 1 A block diagram illustrating a configuration of a driving assistance apparatus according to an embodiment 1.

FIG. 16 A drawing illustrating a display example of the head-up display according to the embodiment 3.

FIG. 17 A flow chart indicating an operation of an output control unit according to the embodiment 3.

FIG. 29 A block diagram illustrating an example of a hardware configuration of the driving assistance apparatus.

FIG. 30 A block diagram illustrating an example of a hardware configuration of the driving assistance apparatus.

DESCRIPTION OF EMBODIMENT(S)

Embodiment 1

Figure 2:
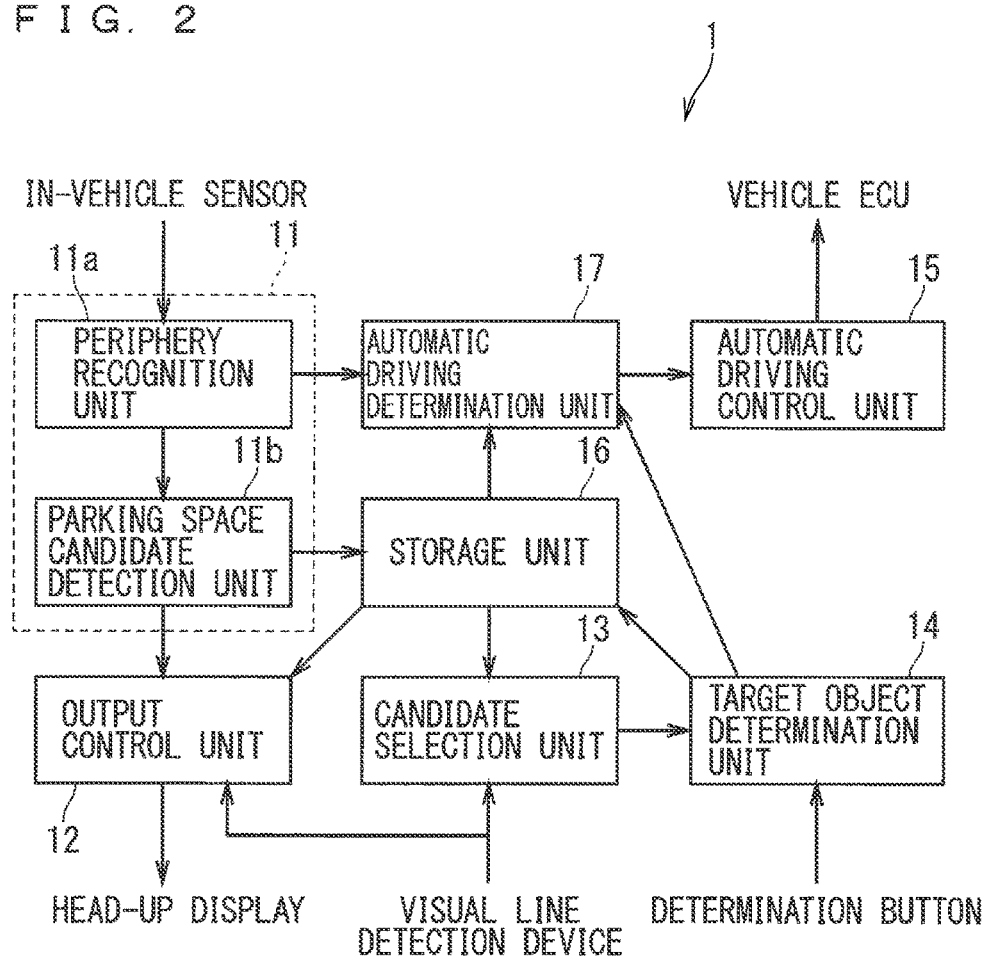
FIG. 2 A block diagram illustrating a configuration of a driving assistance apparatus according to an embodiment 2.

A driving assistance apparatus according to the embodiment 1 of the present invention is an apparatus for assisting a driving of a vehicle which is capable of performing an automatic driving. FIG. 1 is a block diagram illustrating a configuration of the driving assistance apparatus according to the embodiment 1 of the present invention. In the description hereinafter, a vehicle which is capable of performing an automatic driving and whose driving is assisted by a driving assistance apparatus 1 is referred to as "the subject vehicle".

The driving assistance apparatus 1 in FIG. 1 controls a head-up display and determines a target object to which the subject vehicle is to travel, and outputs a determination result to a vehicle electronic control unit (ECU), based on sensing data from an in-vehicle sensor (peripheral information regarding a periphery of the subject vehicle), visual line information from a visual line detection device (visual line information regarding a visual line of a driver of the subject vehicle), and operational information of a determination button. Accordingly, the driving assistance apparatus 1 can make the head-up display distinguishably display a target object candidate, which is a candidate for the target object to which the subject vehicle is to travel, and also can control an automatic driving of the subject vehicle so that the subject vehicle travels to the determined target object. The target object is described in the following embodiments as a parking space in which the subject vehicle is to be parked or a non-subject vehicle which the subject vehicle is to follow, but is not limited thereto.

Before the driving assistance apparatus 1 is described in detail, an in-vehicle sensor, a head-up display, a visual line detection device, a determination button, an automatic driving control unit, and a vehicle ECU are briefly described. The above components are mounted on the subject vehicle.

Applied to the in-vehicle sensor are various sensors described in table 2 of "The Technical Trend of Sensors for Automobiles", Tomoji FUKAYA, Denso Technical View 2006, $11^{th}$ volume, No. 1, pp. 92 to 99, for example. The sensing data which is output from the in-vehicle sensor to the driving assistance apparatus 1 as needed includes, for example, a position or a moving direction of the subject vehicle, a video of a scenery around the subject vehicle, a position of an obstacle around the subject vehicle.

The head-up display displays various information such as an image on a windshield (front glass) of the subject vehicle, thereby displaying the various information to have an overlap with a real scenery for a person in the subject vehicle (a driver and a passenger). Accordingly, the driver can see the various information while seeing the real scenery, thus can smoothly drive the subject vehicle.

A visual line detection sensor (camera) described in Patent Document 2, for example, is applied to the visual line detection device. The visual line information being output from the visual line detection device to the driving assistance apparatus 1 as needed includes, for example, a visual line position of the driver of the subject vehicle and presence or absence of a detection of the visual line position.

The determination button may be a press button (hardware key), for example, and is disposed in an area to be easily operated by the driver (for example, an area around a steering wheel).

The automatic driving control unit outputs a control signal to the vehicle ECU, thereby being able to control an automatic driving of the subject vehicle so that the subject vehicle travels to a target object, which is determined by the driving assistance apparatus 1 (a target object determination unit 14). In the present embodiment 1, the automatic driving includes at least one of a full automatic driving which indicates that the vehicle performs all of driving operations, a semi-automatic driving which indicates that the driver performs some of the driving operations of an accelerator or a brake, for example, and a quasi-automatic driving which indicates that the vehicle performs all of the driving operations under regulated conditions (for example, the subject vehicle travels along an express highway).

The vehicle ECU can control at least one of the accelerator, the brake, and the steering wheel of the subject vehicle, for example, based on the control signal from the automatic driving control unit.

Next, the driving assistance apparatus 1 is described in detail. The driving assistance apparatus 1 in FIG. 1 includes a candidate acquisition unit 11, an output control unit 12, a candidate selection unit 13, and the target object determination unit 14. Next, each constituent element of the driving assistance apparatus 1 in FIG. 1 is described in detail.

The candidate acquisition unit 11 acquires a target object candidate, which is a candidate for the target object and detected based on the sensing data from the in-vehicle sensor. A position and a range of the target object candidate, for example, are thereby acquired. The candidate acquisition unit 11 may acquire the target object candidate, which is detected by an external device based on the sensing data, from the external device, or the candidate acquisition unit 11 may detect (acquire) the target object candidate based on the sensing data. A setting range is set for the target object candidate acquired by the candidate acquisition unit 11. A range of the target object candidate acquired by the candidate acquisition unit 11 itself may be set as the setting range, or an enlarged or decreased range of the target object candidate may also be set as the setting range. In the description described hereinafter, the candidate acquisition unit 11 sets the setting range for each of a plurality of target object candidates, however, the configuration of the candidate acquisition unit 11 is not limited thereto.

The output control unit 12 makes the head-up display display the setting range being set for each of the plurality of target object candidates acquired by the candidate acquisition unit 11.

When the candidate selection unit 13 determines, based on the visual line information, that the visual line position of the driver is included in the setting range of one target object candidate among the plurality of target object candidates, the candidate selection unit 13 selects the one target object candidate.

When the determination button which can be operated by the driver is operated after the candidate selection unit 13 selects the target object candidate, the target object determination unit 14 determines (establishes) the target object candidate selected by the candidate selection unit 13 as the target object. Then, the target object determination unit 14 outputs the determined target object to the automatic driving control unit.

Conclusion of Embodiment 1

According to the driving assistance apparatus 1 of the embodiment 1 described above, when it is determined that the visual line position of the driver is included in the setting range of one target object candidate among the setting ranges of the plurality of target object candidates, the one target object candidate is selected, and when the determination button is operated afterward, the selected target object candidate is determined as the target object to which the subject vehicle is to travel. Accordingly, the driver can intuitively select and determine the target object from the target object candidates.

Embodiment 2

FIG. 2 is a block diagram illustrating a configuration of the driving assistance apparatus according to the embodiment 2 of the present invention. The same reference numerals as those described in the embodiment 1 will be assigned to the same or similar constituent element in the driving assistance apparatus 1 according to the embodiment 2, and the different constituent elements are mainly described hereinafter.

The driving assistance apparatus 1 according to the embodiment 2 can control the automatic driving of the subject vehicle so that the subject vehicle travels to a parking space in which the subject vehicle is to be parked (the target object to which the subject vehicle is to travel). That is to say, the parking space in which the subject vehicle is to be parked is applied to the target object.

The driving assistance apparatus 1 in FIG. 2 includes an automatic driving control unit 15, a storage unit 16, and an automatic driving determination unit 17 in addition to the constituent element described in the embodiment 1. The candidate acquisition unit 11 described in the embodiment 1 includes a periphery recognition unit 11a and a parking space candidate detection unit 11b. Each constituent element of the driving assistance apparatus 1 in FIG. 2 is described in detail hereinafter.

<Periphery Recognition Unit 11a>

The periphery recognition unit 11a in FIG. 2 generates a periphery map based on the sensing data acquired from the in-vehicle sensor (the periphery information regarding the periphery of the subject vehicle). Herein, the periphery map indicates a map constituted by modeling various shapes around the subject vehicle in a three-dimensional space. For example, the periphery recognition unit 11a combines white line information and information of an obstacle such as the non-subject vehicle, for example, which are detected from an image taken with a front camera (one type of the in-vehicle sensor) with a distance from the subject vehicle to the obstacle which is accurately measured by a sonar sensor (one type of the in-vehicle sensor), thereby generating the periphery map constituted by modeling shapes of the white line and obstacle in a moving direction of the subject vehicle.

The various shapes in the periphery map may be distinguished and constituted by a point group, but may also be distinguished and constituted by an object unit such as a wall, a white line, or various moving body (for example, a forward vehicle or a pedestrian). The periphery recognition unit 11a may combine high-accuracy map data and a dynamic map, for example, into the sensing data from the in-vehicle sensor to generate the periphery map. When the periphery recognition unit 11a is constituted to acquire the map data including parking space information in a parking area or acquire usage conditions of each parking space in real time via network, the parking space information in the parking area and the usage conditions of each parking space may be included in the periphery map.

Figure 3:
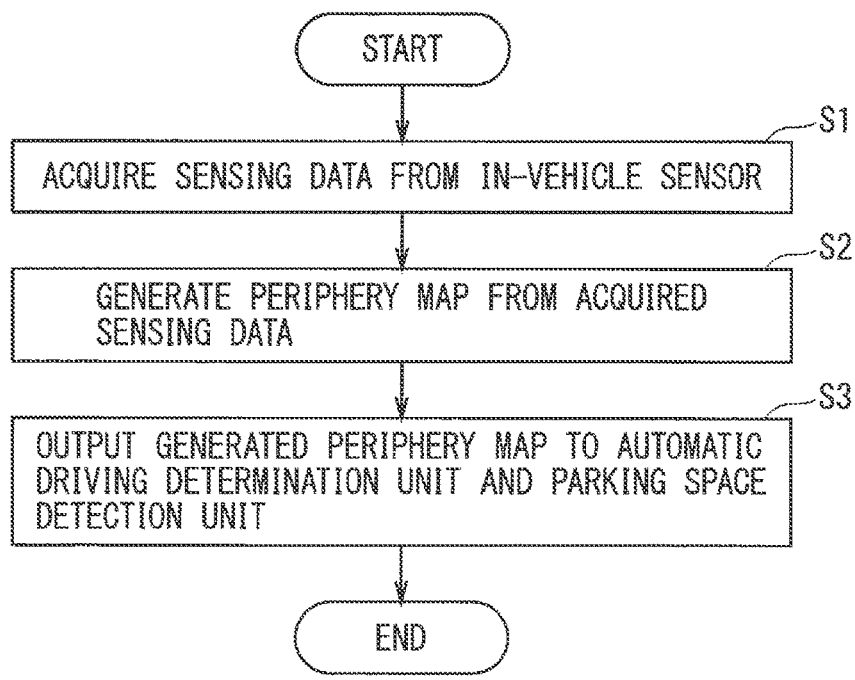
FIG. 3 A flow chart indicating an operation of a periphery recognition unit according to the embodiment 2.

FIG. 3 is a flow chart indicating an operation of the periphery recognition unit 11a according to the present embodiment 2.

In Step S1, the periphery recognition unit 11a acquires the sensing data from the in-vehicle sensor. In Step S2, the periphery recognition unit 11a generates the periphery map based on the acquired sensing data. In Step S3, the periphery recognition unit 11a outputs the generated periphery map to the automatic driving determination unit 17 and the parking space candidate detection unit 11b. Subsequently, the operation in FIG. 3 is finished. The operation in FIG. 3 and operations described using flow charts in the drawings subsequent to FIG. 3 are performed repeatedly in real time, for example.

<Parking Space Candidate Detection Unit 11b>

The parking space candidate detection unit 11b in FIG. 2 detects (senses) the parking space in which the subject vehicle can be parked as a parking space candidate based on the periphery map generated by the periphery recognition unit 11a. Herein, the parking space candidate indicates a candidate for the parking space to which the subject vehicle is to travel, and the detection of the parking space candidate includes a detection of a position and a range of the parking space candidate. The operation of the candidate acquisition unit 11 acquiring the target object candidate such as the parking space candidate is substantially the same as the operation of the parking space candidate detection unit 11b detecting the target object candidate such as the parking space candidate.

For example, the parking space candidate detection unit 11b generates the white line information and the information of the positional interval with the non-subject vehicle based on the periphery map, and detects the parking space candidate based on the information. When the periphery map includes the parking space information in the parking area and the usage conditions of each parking space, the parking space candidate detection unit 11b may detect the parking space candidate in consideration of those information and conditions. In the present embodiment 2, the parking space candidate detection unit 11b sets the setting range for the detected parking space candidate.

Figure 4:
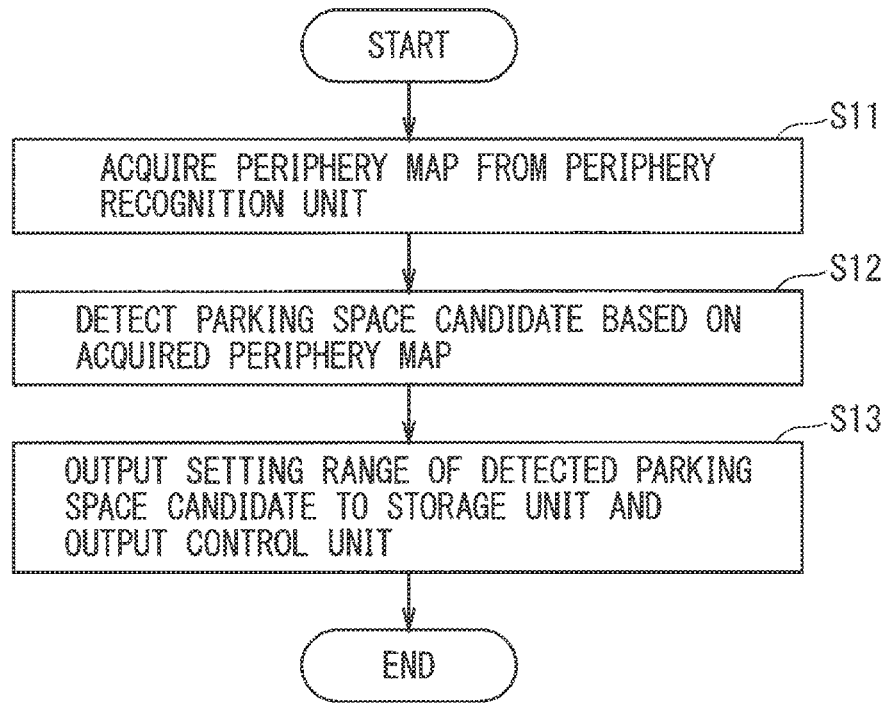
FIG. 4 A flow chart indicating an operation of a parking space candidate detection unit according to the embodiment 2.

FIG. 4 is a flow chart indicating an operation of the parking space candidate detection unit 11b according to the present embodiment 2.

In Step S11, the parking space candidate detection unit 11b acquires the periphery map from the periphery recognition unit 11a. In Step S12, the parking space candidate detection unit 11b detects the parking space candidate based on the acquired periphery map. In Step S13, the parking space candidate detection unit 11b sets the setting range for the detected parking space candidate and outputs the setting range to the storage unit 16 and the output control unit 12. Subsequently, the operation in FIG. 4 is finished.

<Storage Unit 16>

The storage unit 16 in FIG. 2 stores the setting range of the parking space candidate detected by the parking space candidate detection unit 11b and the parking space determined by the target object determination unit 14.

Figure 5:
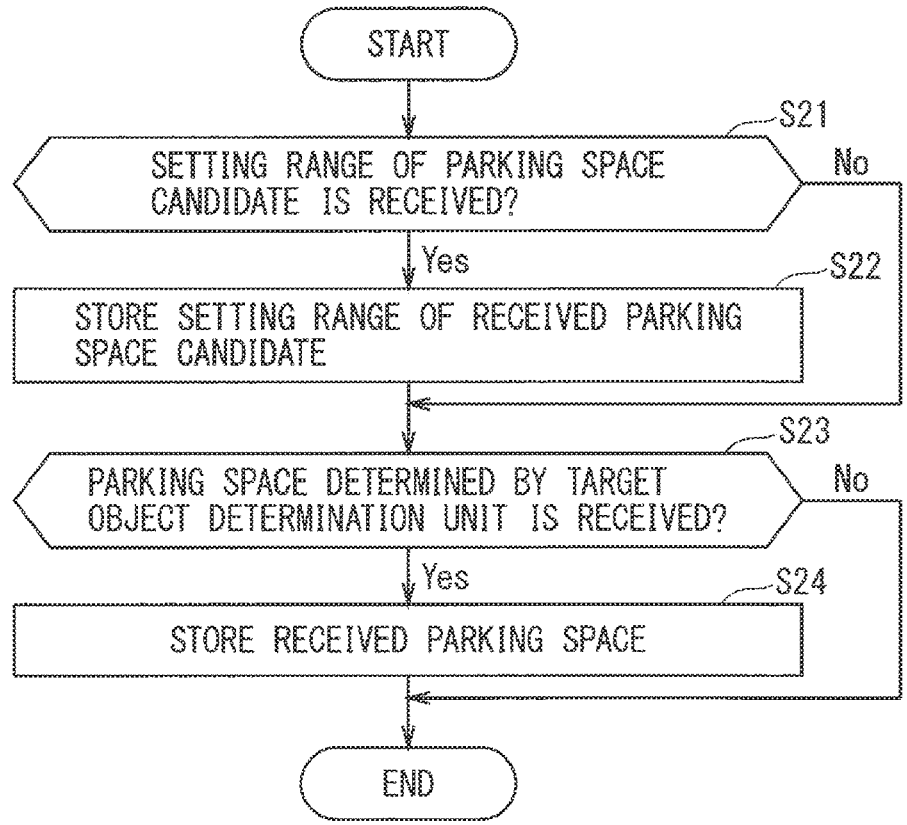
FIG. 5 A flow chart indicating an operation of a storage unit according to the embodiment 2.

FIG. 5 is a flow chart indicating an operation of the storage unit 16 according to the present embodiment 2.

In Step S21, when the storage unit 16 receives the setting range of the parking space candidate from the parking space candidate detection unit 11b, the processing proceeds to Step S22, and when the storage unit 16 does not receive the setting range, the processing proceeds to Step S23. In Step S22, the storage unit 16 stores the received setting range of the parking space candidate. The setting range of the parking space candidate stored in the storage unit 16 may be appropriately updated by the parking space candidate detection unit 11b.

In Step S23, when the storage unit 16 receives the parking space determined by the target object determination unit 14, the processing proceeds to Step S24, and when the storage unit 16 does not receive the parking space, the operation in FIG. 5 is finished. In Step S24, the storage unit 16 stores the received parking space (the parking space determined by the target object determination unit 14). Subsequently, the operation in FIG. 5 is finished.

<Output Control Unit 12>

Figure 6:
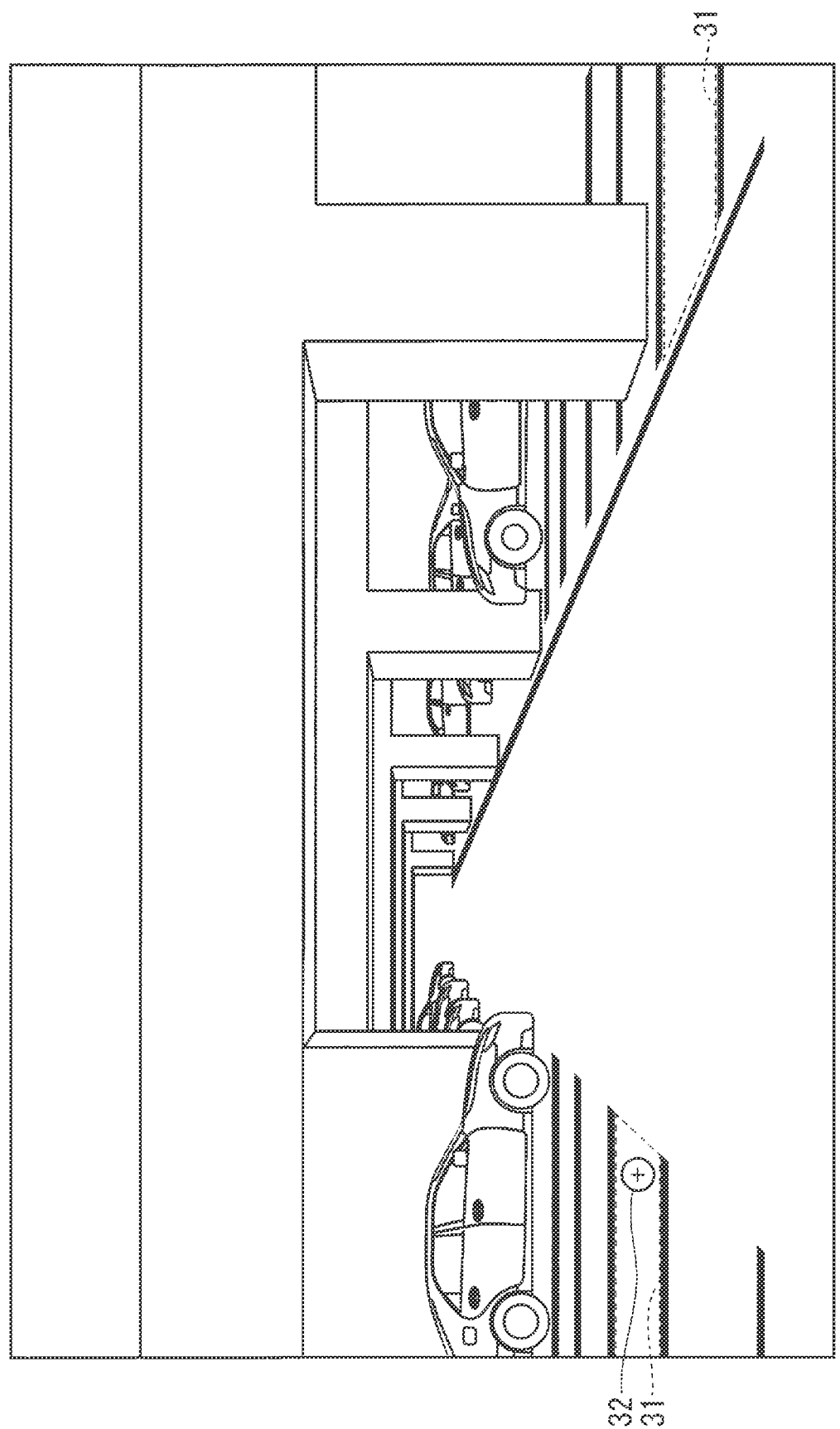
FIG. 6 A drawing illustrating a display example of a head-up display according to the embodiment 2.

FIG. 6 is a drawing illustrating a display example of a head-up display according to the present embodiment 2.

The output control unit 12 makes the head-up display distinguishably display the setting ranges of the plurality of parking space candidates detected by the parking space candidate detection unit 11b. In FIG. 6, two setting ranges 31 of two parking space candidates are distinguishably displayed by broken lines.

The output control unit 12 makes the head-up display distinguishably display the visual line position of the driver based on the visual line information acquired from the visual line detection device. In FIG. 6, a visual line position 32 of the driver is distinguishably displayed by a mark formed by putting + in a circle.

Figure 7:
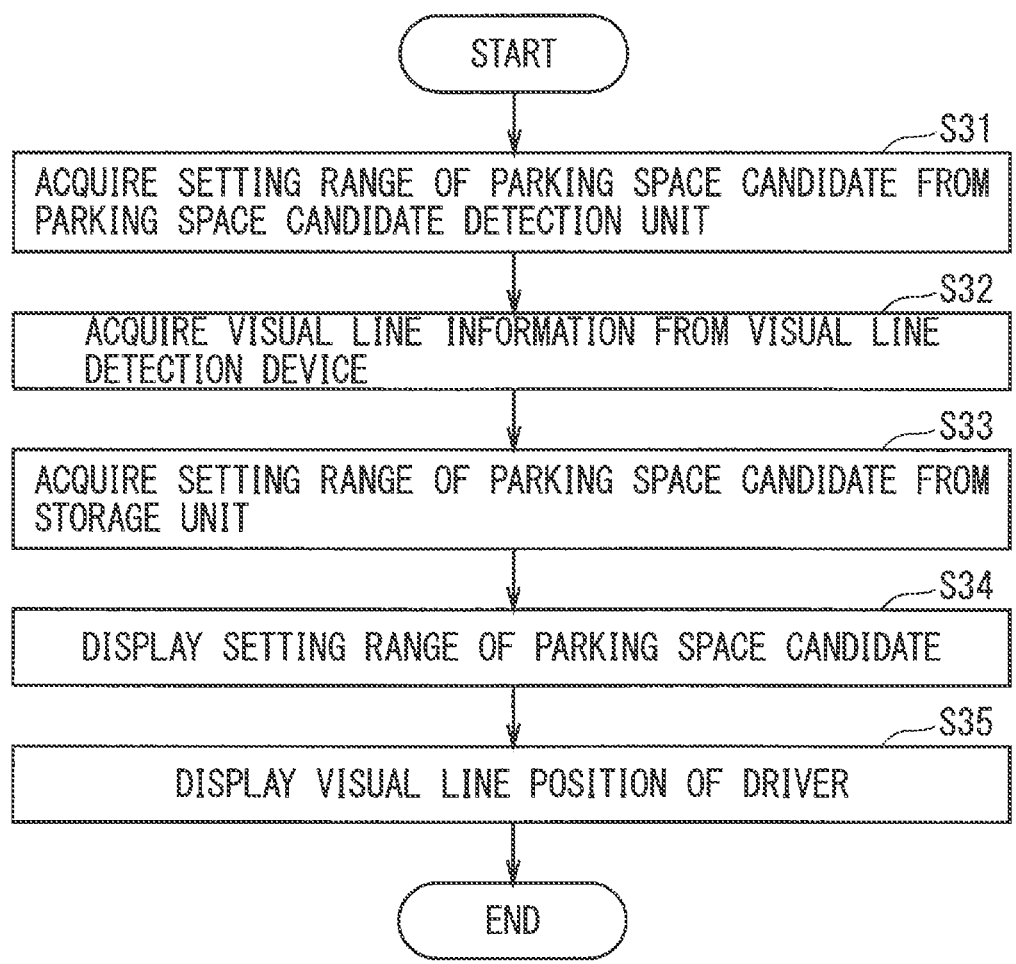
FIG. 7 A flow chart indicating an operation of an output control unit according to the embodiment 2.

FIG. 7 is a flow chart indicating an operation of the output control unit 12 according to the present embodiment 2.

In Step S31, the output control unit 12 acquires the setting range of a most recent parking space candidate from the parking space candidate detection unit 11b. In Step S32, the output control unit 12 acquires the visual line information from the visual line detection device. In Step S33, the output control unit 12 acquires the setting range of a parking space candidate which is earlier than the most recent one from the storage unit 16.

In Step S34, the output control unit 12 performs a control of making the head-up display display the setting range of the parking space candidate acquired in Steps S31 and S33. Accordingly, the setting range of the parking space candidate is distinguishably displayed in association with the parking space in the real scenery as illustrated in FIG. 6. When the setting range of the parking space candidate is not acquired in Steps S31 and S33, the display control described above is not performed.

In Step S35, the output control unit 12 performs a control of making the head-up display display the visual line position of the driver based on the visual line information acquired in Step S32. Accordingly, the visual line position of the driver is distinguishably displayed to have an overlap with the real scenery as illustrated in FIG. 6. When the visual line information is not acquired or when the visual line of the driver is directed inside the vehicle in Step S32, the display control described above is not performed. Subsequently, the operation in FIG. 7 is finished.

<Candidate Selection Unit 13>

When the candidate selection unit 13 in FIG. 2 determines, based on the visual line information acquired from the visual line detection device, that the visual line position of the driver is included in the setting range of one parking space candidate among the setting range of the plurality of parking space candidates (target object candidates), the candidate selection unit 13 selects the one parking space candidate.

Figure 8:
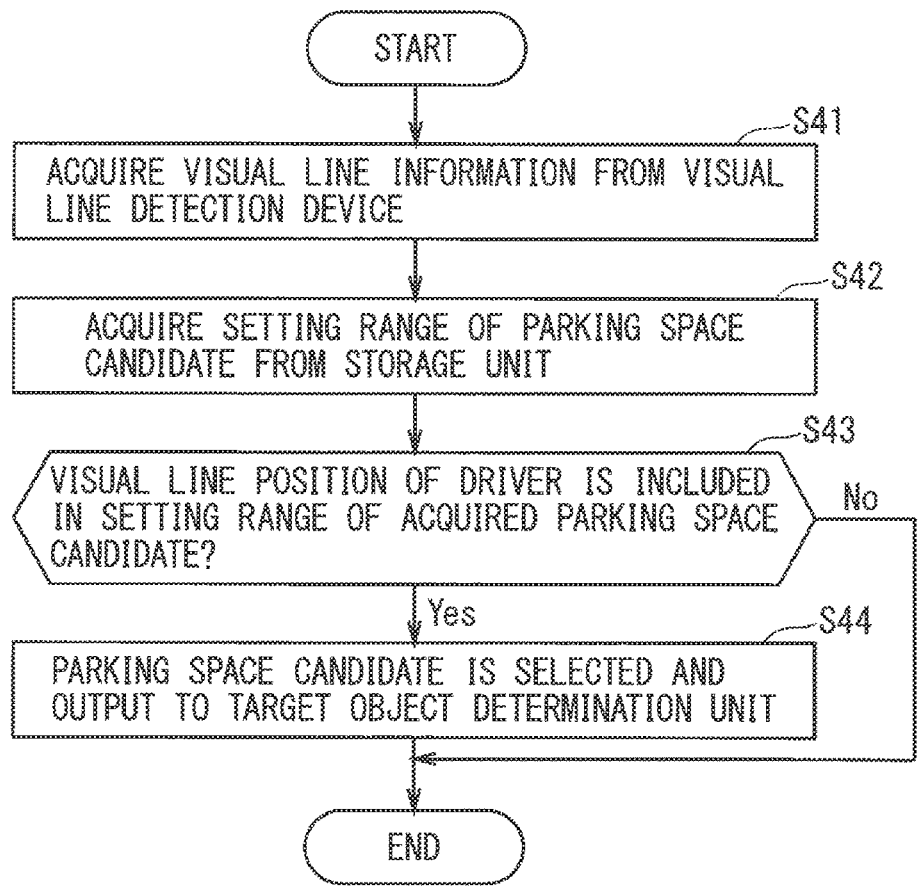
FIG. 8 A flow chart indicating an operation of a candidate selection unit according to the embodiment 2.

FIG. 8 is a flow chart indicating an operation of the candidate selection unit 13 according to the present embodiment 2.

In Step S41, the candidate selection unit 13 acquires the visual line information from the visual line detection device. In Step S42, the candidate selection unit 13 acquires the setting range of a parking space candidate from the storage unit 16.

In Step S43, the candidate selection unit 13 determines whether or not the visual line position of the driver based on the acquired visual line information is included in any of the setting ranges of the acquired plurality of parking space candidates. When the candidate selection unit 13 determines that the visual line position is included in the setting range, the processing proceeds to Step S44, and when the candidate selection unit 13 determines that the visual line position is not included in the setting range, the operation in FIG. 8 is finished.

In Step S44, the candidate selection unit 13 selects the determined parking space candidate, and outputs the selected parking space candidate to the target object determination unit 14. Subsequently, the operation in FIG. 8 is finished.

<Target Object Determination Unit 14>

When the determination button is operated after the candidate selection unit 13 selects the parking space candidate, the target object determination unit 14 in FIG. 2 determines (establishes) the parking space candidate selected by the candidate selection unit 13 as the parking space to which the subject vehicle is to travel. Then, the target object determination unit 14 outputs the determined target object to the automatic driving determination unit 17 (substantially the automatic driving control unit 15), for example.

Figure 9:
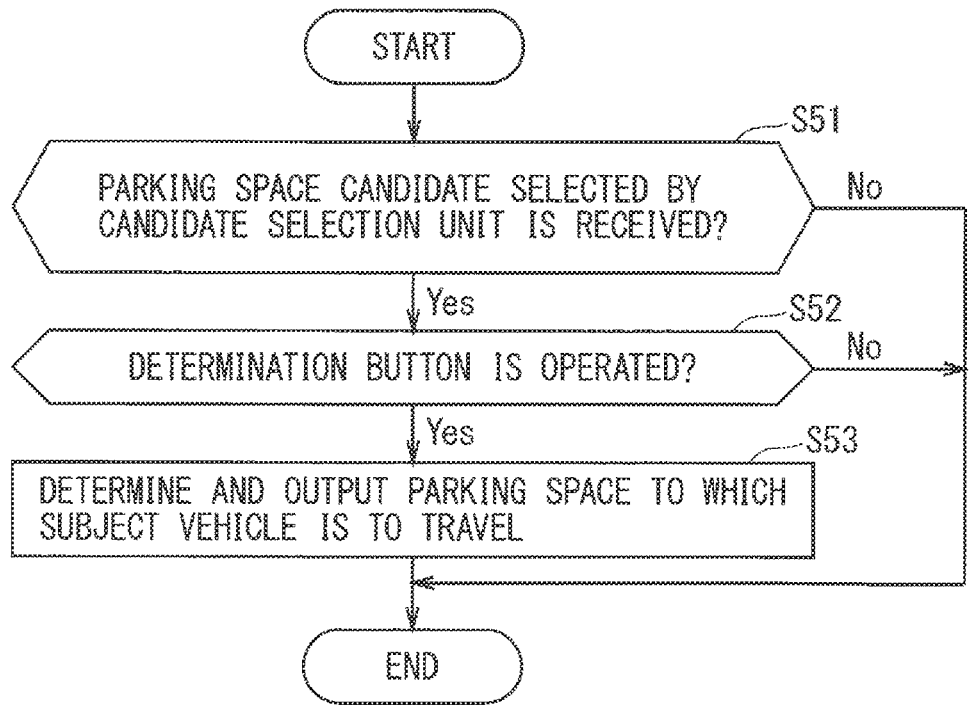
FIG. 9 A flow chart indicating an operation of a target object determination unit according to the embodiment 2.

FIG. 9 is a flow chart indicating an operation of the target object determination unit 14 according to the present embodiment 2.

In Step S51, the target object determination unit 14 determines whether or not the target object determination unit 14 receives the parking space candidate selected by the candidate selection unit 13. When the candidate selection unit 13 determines that the parking space candidate is received, the processing proceeds to Step S52, and when the candidate selection unit 13 determines that the parking space candidate is not received, the operation in FIG. 9 is finished.

When the processing proceeds to Step S52, it is also applicable that the parking space candidate selected by the candidate selection unit 13 is output to the output control unit 12 and the output control unit 12 thereby makes the head-up display display a display for making the driver confirm whether to determine the parking space candidate or not.

In Step S52, the target object determination unit 14 determines whether or not the determination button is operated. When the target object determination unit 14 determines that the determination button is operated, the processing proceeds to Step S53, and when the target object determination unit 14 determines that the determination button is not operated, the operation in FIG. 9 is finished.

In Step S53, the target object determination unit 14 determines the parking space candidate received in Step S51 as the parking space to which the subject vehicle is to travel (the target object), and outputs the determined parking space to the storage unit 16 and the automatic driving determination unit 17. Subsequently, the operation in FIG. 9 is finished.

<Automatic Driving Determination Unit 17>

When the parking space is determined by the target object determination unit 14, the automatic driving determination unit 17 in FIG. 2 generates travel route information used when the subject vehicle travels to the parking space, for example, based on the periphery map generated by the periphery recognition unit 11a. The travel route information includes trace information which indicates a route along which the subject vehicle is to travel from a current position at a time of traveling to the parking space, for example, and information in which a target speed, a target acceleration rate, and a target steering angle during the traveling are arranged in chronological order.

Figure 10:
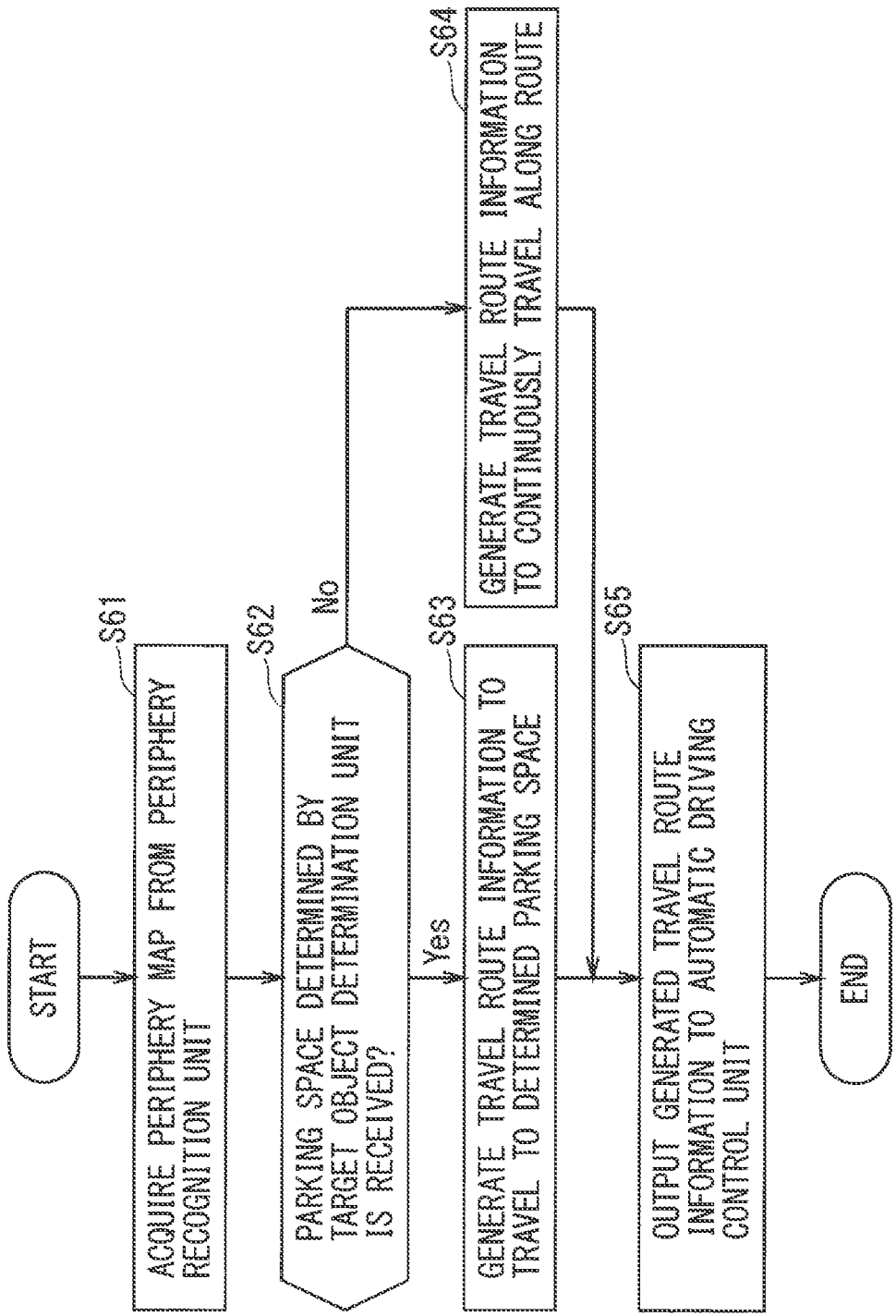
FIG. 10 A flow chart indicating an operation of an automatic driving determination unit according to the embodiment 2.

FIG. 10 is a flow chart indicating an operation of the automatic driving determination unit 17 according to the present embodiment 2.

In Step S61, the automatic driving determination unit 17 acquires the periphery map from the periphery recognition unit 11a. In Step S62, the automatic driving determination unit 17 determines whether or not the automatic driving determination unit 17 receives the parking space determined by the target object determination unit 14. When the automatic driving determination unit 17 determines that the parking space is received, the processing proceeds to Step S63, and when the automatic driving determination unit 17 determines that the parking space is not received, the processing proceeds to Step S64.

In Step S63, the automatic driving determination unit 17 generates the travel route information used when the subject vehicle travels to the parking space based on the acquired periphery map and the received parking space. Subsequently, the processing proceeds to Step S65.

In Step S64, the automatic driving determination unit 17 generates the travel route information used when the subject vehicle continuously travels along the route based on the acquired periphery map. Subsequently, the processing proceeds to Step S65.

In Step S65, the automatic driving determination unit 17 outputs the generated travel route information to the automatic driving control unit 15. Subsequently, the operation in FIG. 10 is finished.

<Automatic Driving Control Unit 15>

The automatic driving control unit 15 in FIG. 2 outputs the control signal to the vehicle ECU, thereby controlling the automatic driving of the subject vehicle so that the subject vehicle travels to the parking space determined by the target object determination unit 14 (the target object).

Figure 11:
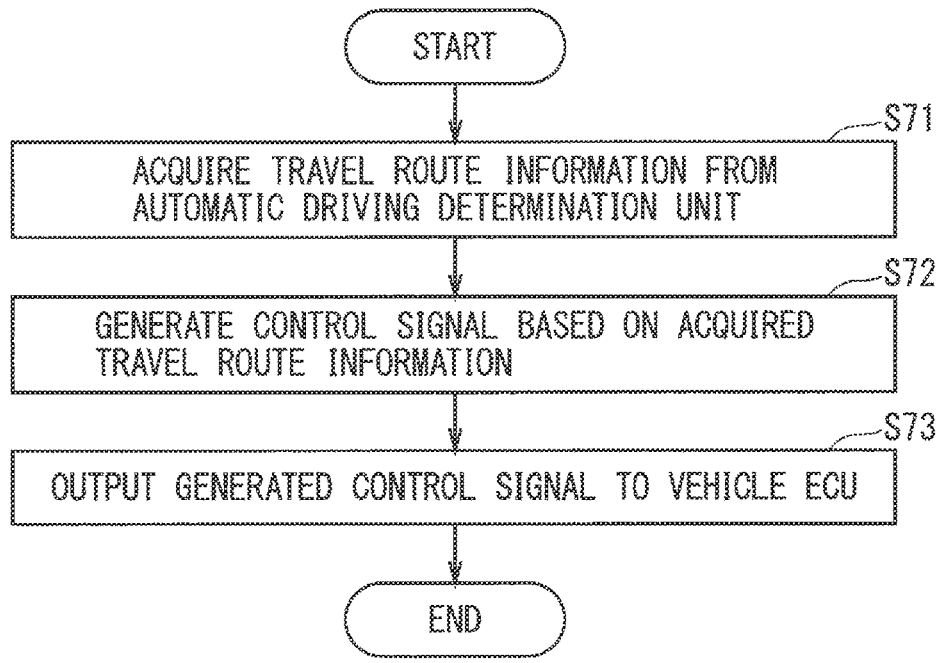
FIG. 11 A flow chart indicating an operation of an automatic driving control unit according to the embodiment 2.

FIG. 11 is a flow chart indicating an operation of the automatic driving control unit 15 according to the present embodiment 2.

In Step S71, the automatic driving control unit 15 acquires the travel route information from the automatic driving determination unit 17. In Step S72, the automatic driving control unit 15 generates the control signal to be output to the vehicle ECU based on the acquired travel route information. In Step S73, the automatic driving control unit 15 outputs the generated control signal to the vehicle ECU. Subsequently, the operation in FIG. 11 is finished.

Conclusion of Embodiment 2

According to the present embodiment 2 having the configuration described above, the driver can intuitively select and determine the parking space to which the subject vehicle is to travel among the parking space candidates in a manner similar to the embodiment 1. When the automatic driving of the subject vehicle is the complete automatic driving, a reduction in time of an automatic parking can be expected.

In the present embodiment 2, the head-up display distinguishably displays the visual line position 32 of the driver (FIG. 6). Accordingly, the driver can easily point the visual line position 32 of the driver to the setting range 31 of the parking space candidate which the driver intends to select.

Modification Example

Figure 12:
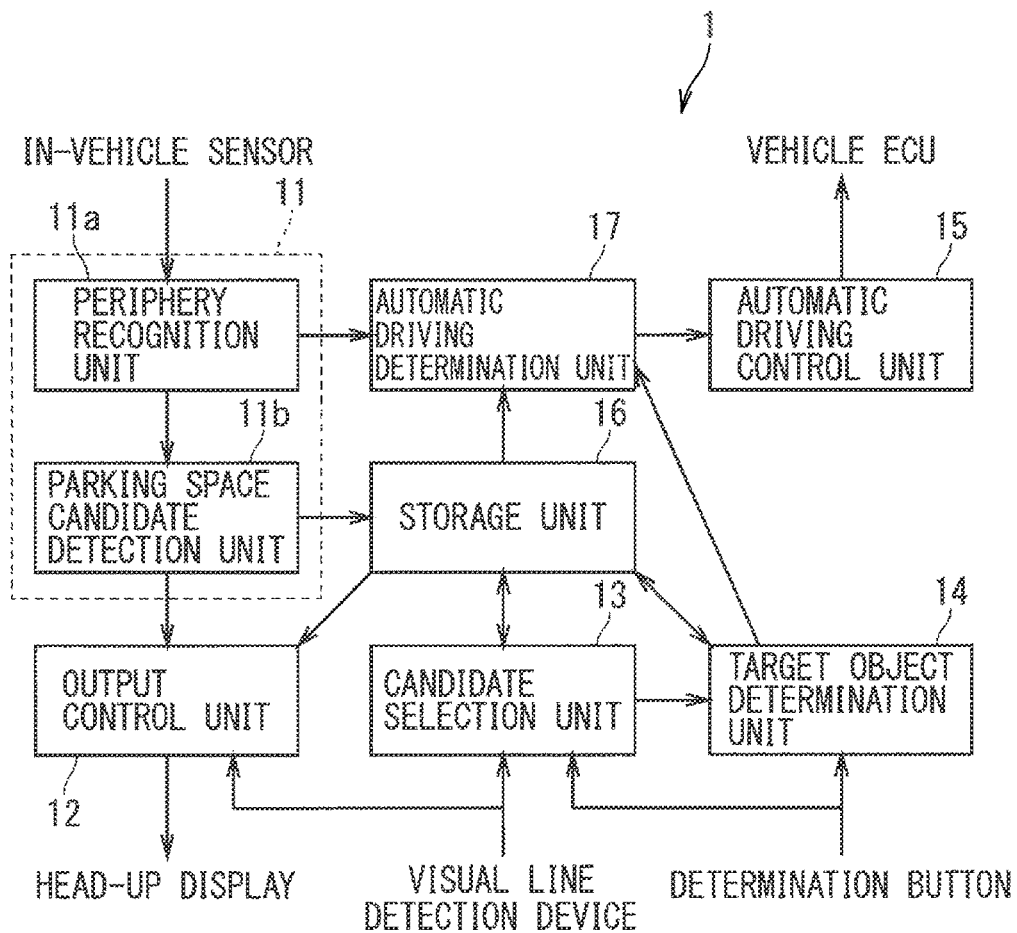
FIG. 12 A block diagram illustrating a configuration of a driving assistance apparatus according to a modification example.

FIG. 12 is a block diagram illustrating a configuration of a driving assistance apparatus according to the present modification example. The same reference numerals as those described in the embodiment 2 will be assigned to the same or similar constituent element in the driving assistance apparatus 1 according to the present modification example, and the different constituent elements are mainly described hereinafter.

In the present modification example, when the determination button is operated before the candidate selection unit 13 selects the parking space candidate, the visual line position of the driver based on the visual line information (for example, the visual line position in the periphery map) is stored in the storage unit 16. That is to say, when the determination button is operated before the candidate selection unit 13 selects the parking space candidate, the storage unit 16 stores the visual line position of the driver based on the visual line information. At this time, the output control unit 12 may make the head-up display a display informing that the parking space corresponding to the visual line position has not been detected.

When it is determined that the visual line position stored in the storage unit 16 is included in the setting range of the parking space candidate detected by the parking space candidate detection unit 11*b* after the determination button is operated, the target object determination unit 14 determines the parking space candidate as the parking space to which the subject vehicle is to travel.

According to the present modification example as described above, when the driver operates the determination button before the driving assistance apparatus 1 detects the parking space, the parking space can be temporarily determined. Accordingly, the driver-friendly driving assistance apparatus 1 can be achieved. The determination whether or not the visual line position stored in the storage unit 16 is included in the setting range of the parking space candidate may be performed by the candidate selection unit 13.

Embodiment 3

Figure 13:
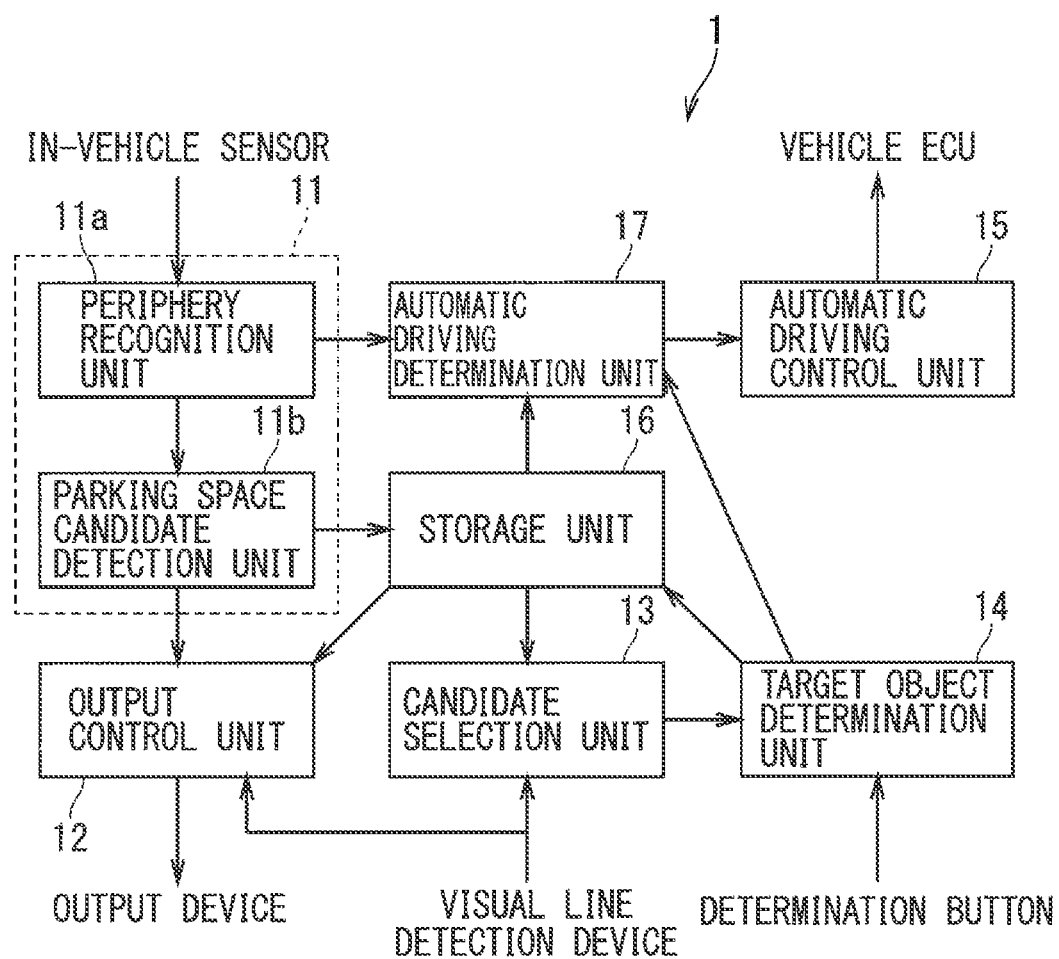
FIG. 13 A block diagram illustrating a configuration of a driving assistance apparatus according to an embodiment 3.

FIG. 13 is a block diagram illustrating a configuration of a driving assistance apparatus according to the embodiment 3 of the present invention. The same reference numerals as those described in the embodiment 2 will be assigned to the same or similar constituent element in the driving assistance apparatus 1 according to the present embodiment 3, and the different constituent elements are mainly described hereinafter.

The driving assistance apparatus 1 (the output control unit 12) according to the present embodiment 3 can control an output device. Herein, the output device includes a plurality of audio output devices (for example, a plurality of speaker) mounted on the subject vehicle in addition to the head-up display describe above.

Firstly, a display control of the head-up display performed by the output control unit 12 is described.

Figure 14:
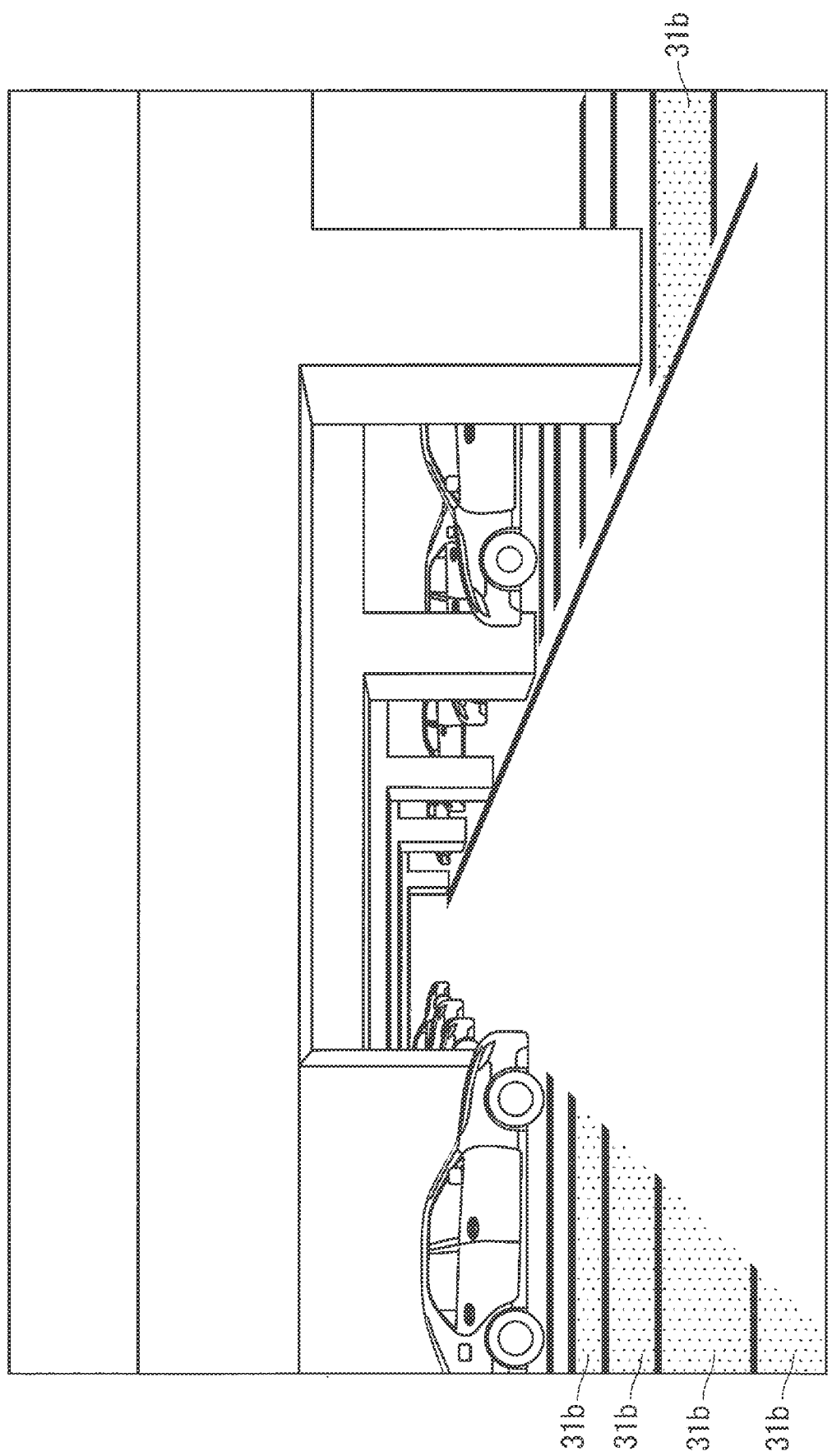
FIG. 14 A drawing illustrating a display example of a head-up display according to the embodiment 3.
Figure 15:
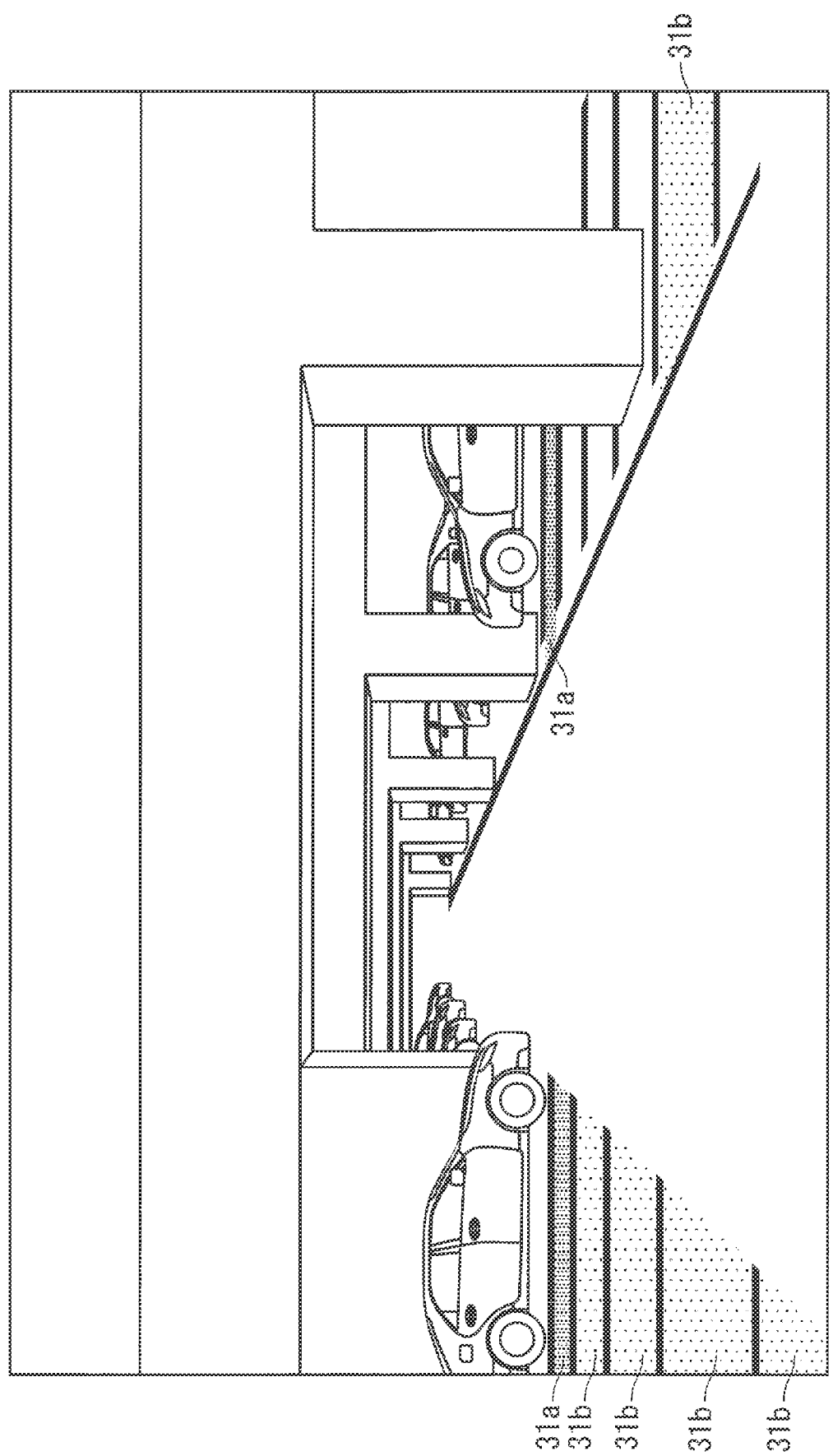
FIG. 15 A drawing illustrating a display example of the head-up display according to the embodiment 3.

In the present embodiment 3, the output control unit 12 changes a display mode of the setting range of the parking space candidate displayed by the head-up display based on a timing of detecting the parking space candidate in the parking space candidate detection unit 11*b*. FIG. 14 illustrates a display example of the head-up display before the parking space candidate detection unit 11*b* newly detects the setting range 31*a* of the parking space candidate, and FIG. 15 illustrates a display example of the head-up display after the parking space candidate detection unit 11*b* newly detects the setting range 31*a* of the parking space candidate. As illustrated in FIG. 14 and FIG. 15, the output control unit 12 may highlight the setting range 31*a* of the parking space candidate, which has been detected by the parking space candidate detection unit 11*b* most recently, in a display mode (for example, a display color, an addition of a mark or an icon, or an animation) different from that of the setting range 31*b* of the parking space candidate, which has been detected earlier than the most recent one. The above configuration enables the driver to direct the driver's attention to the parking space candidate which has been detected most recently.

As illustrated in FIG. 16, when the visual line position 32 of the driver is included in the setting range 31*c* of one parking space candidate among the setting ranges of the plurality of parking space candidates detected by the parking space candidate detection unit 11*b*, the output control unit 12 makes the head-up display distinguishably display the setting range 31*c* of the one parking space candidate and setting ranges 31*d* of the other parking space candidates. That is to say, the setting range of the one parking space candidate selected by the candidate selection unit 13 and the setting ranges of the other parking space candidates are distinguishably displayed.

The distinguishable display may include a highlighting of the setting range 31*c* of the one parking space candidate in the display mode (for example, a display color, an addition of a mark or an icon, or an animation) different from that of the setting ranges 31*d* of the other parking space candidates. In the description herein, the output control unit 12 determines whether or not the visual line position 32 of the driver is included in the setting range of the one parking space candidate, however, the candidate selection unit 13 may also perform the determination.

The output control unit 12 may distinguishably display the setting range of the parking space candidate before being determined by the target object determination unit 14 and the setting range of the parking space determined by the target object determination unit 14, in the manner similar to the display control described above. In the similar manner, the output control unit 12 may also distinguishably display the setting range of the parking space candidate recommended by the driving assistance apparatus 1 and the setting range of the other parking space candidate.

Described next is an audio output control of a plurality of audio output devices performed by the output control unit 12.

The output control unit 12 makes the audio output device output a notification sound (output audio) when the output control unit 12 changes the display mode of the parking space candidate displayed by the head-up display.

The output control unit 12 controls the audio output of the plurality of audio output devices mounted on the subject vehicle based on the position of the parking space candidate which has been detected by the parking space candidate detection unit 11*b* most recently. For example, when the parking space candidate has been detected most recently by the parking space candidate detection unit 11*b*, the output control unit 12 makes the audio output device, which is located in a direction of the parking space candidate among the plurality of audio output devices, output the notification sound with volume corresponding to a distance to the parking space candidate. The notification sound in the above case may have a tone different from the other notification sound such as an obstacle detection sound. The above configuration enables the driver to direct the driver's attention to the parking space candidate which has been detected most recently.

FIG. 17 is a flow chart indicating an operation of the output control unit 12 according to the present embodiment 3. The same reference numerals as those described in FIG. 7 will be assigned to the similar step in FIG. 17, and the description thereof is appropriately omitted.

In Steps S31 to S33, the output control unit 12 performs the operation similar to Steps S31 to S33 in FIG. 7. Subsequently, in Step S81, the output control unit 12 determines the display mode of the setting range of the parking space candidate to be displayed in accordance with a state of the parking space candidate (whether the setting range includes the visual line position or the parking space candidate has been detected most recently, for example).

In Steps S34 to S35, the output control unit 12 performs the operation similar to Steps S34 to S35 in FIG. 7. Subsequently, in Step S82, the output control unit 12 determines whether or not the display mode of the parking space candidate displayed by the head-up display is changed. When the output control unit 12 determines that the display mode is changed, the processing proceeds to Step S83, and when the output control unit 12 determines that the display mode is not changed, the operation in FIG. 17 is finished.

In Step S83, the output control unit 12 makes the audio output device output the notification sound. Subsequently, the operation in FIG. 17 is finished.

Conclusion of Embodiment 3

In the present embodiment 3, the display mode of the setting range of the parking space candidate displayed by the head-up display is changed based on the timing of detecting the parking space candidate. The above configuration enables the driver to direct the driver's attention to the parking space candidate which has been detected most recently, for example.

In the present embodiment 3, when the visual line position of the driver is included in the setting range of the one parking space candidate among the setting ranges of the plurality of parking space candidates, the head-up display distinguishably displays the setting range of the one parking space candidate and the setting ranges of the other parking space candidates. The above configuration enables the driver to determine the parking space after recognizing which setting range is selected.

Furthermore, in the present embodiment 3, the audio output device outputs the audio when the display mode of the parking space candidate displayed by the head-up display is changed. The above configuration enables the driver to recognize that the display mode of the parking space candidate is changed.

In the present embodiment 3, the audio output of the plurality of audio output devices mounted on the subject vehicle is controlled based on the position of the parking space candidate which has been detected most recently. The above configuration enables the driver to recognize the position of the parking space candidate which has been detected most recently with a help of the sound.

Modification Example

The output control unit 12 may make the head-up display pop up the setting range of the parking space candidate which is not detected by the parking space candidate detection unit 11b based on the periphery information generated in the subject vehicle but detected by the parking space candidate detection unit 11b based on the periphery information generated outside the subject vehicle (for example, network). According to such a configuration, the setting range of the parking space candidate which cannot be detected based on the periphery information of the subject vehicle and is hardly seen from a viewpoint of the driver can be seen easily.

Embodiment 4

Figure 18:
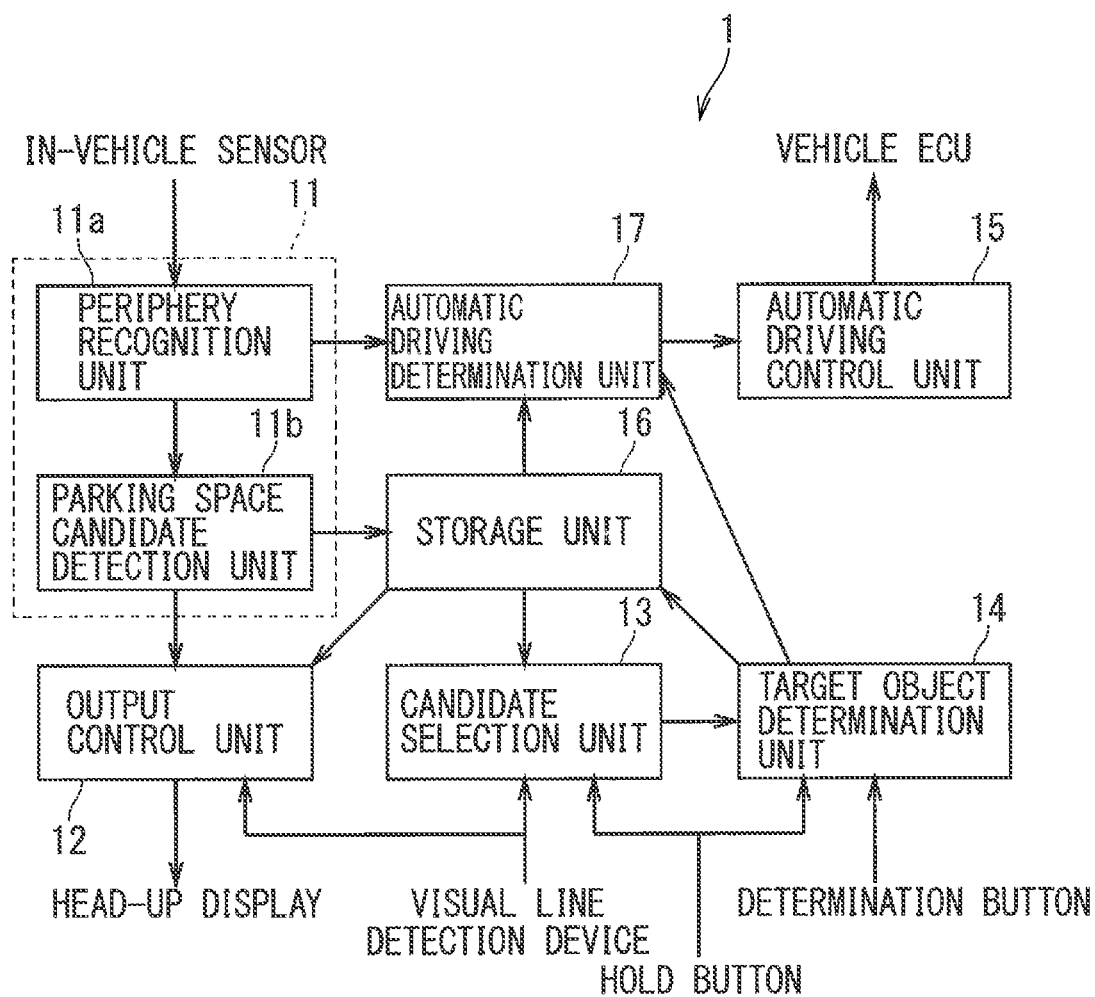
FIG. 18 A block diagram illustrating a configuration of a driving assistance apparatus according to an embodiment 4.

FIG. 18 is a block diagram illustrating a configuration of a driving assistance apparatus according to the embodiment 4 of the present invention. The same reference numerals as those described in the embodiment 2 will be assigned to the same or similar constituent element in the driving assistance apparatus 1 according to the present embodiment 4, and the different constituent elements are mainly described hereinafter.

<Candidate Selection Unit 13>

Operational information of a hold button is input to the driving assistance apparatus 1 according to the present embodiment 4. When the hold button is operated after the parking space candidate is selected by the candidate selection unit 13, the candidate selection unit 13 makes the storage unit 16 store the selected parking space candidate. That is to say, when the hold button is operated (when a predetermined operation other than the operation of the determination button is performed) after the parking space candidate is selected by the candidate selection unit 13, the storage unit 16 stores the parking space candidate selected by the candidate selection unit 13.

Figure 19:
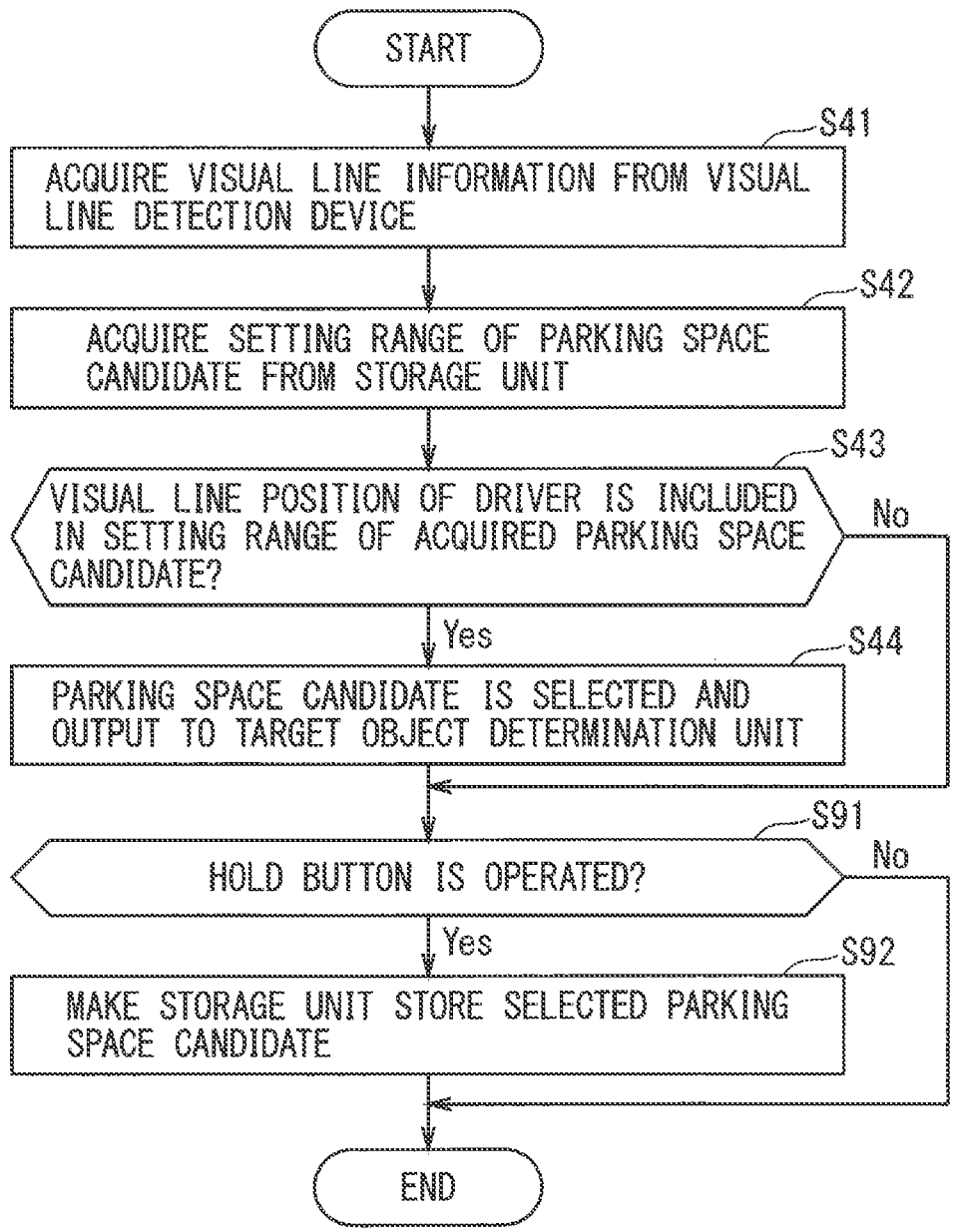
FIG. 19 A flow chart indicating an operation of a candidate selection unit according to the embodiment 4.

FIG. 19 is a flow chart indicating an operation of the candidate selection unit 13 according to the present embodiment 4. The same reference numerals as those described in FIG. 8 will be assigned to the similar step in FIG. 19, and the description thereof is appropriately omitted.

In Steps S41 to S44, the candidate selection unit 13 performs the operation similar to Steps S41 to S44 in FIG. 8. After Step S44, in Step S91, the candidate selection unit 13 determines whether or not the hold button is operated. When the candidate selection unit 13 determines that the hold button is operated, the processing proceeds to Step S92, and when the candidate selection unit 13 determines that the hold button is not operated, the operation in FIG. 19 is finished.

In Step S92, the candidate selection unit 13 makes the storage unit 16 store the parking space candidate selected in Step S44. At this time, the driving assistance apparatus 1 may extract, from the sensing data, associated information regarding the parking space candidate, and store, in the storage unit 16, the associated information and information that the parking space candidate is put on hold together with the parking space candidate. The associated information includes a video of a camera and positional information of a global positioning system (GPS), for example. The configuration described above is capable of supplying to the driver what kind of parking space a stored (held) parking space candidate is. Subsequently, the operation in FIG. 19 is finished.

<Target Object Determination Unit 14>

When the determination button is operated after the hold button is operated, the target object determination unit 14 determines the parking space candidate stored in the storage unit 16 by the candidate selection unit 13 as the parking space to which the subject vehicle it to travel.

Figure 20:
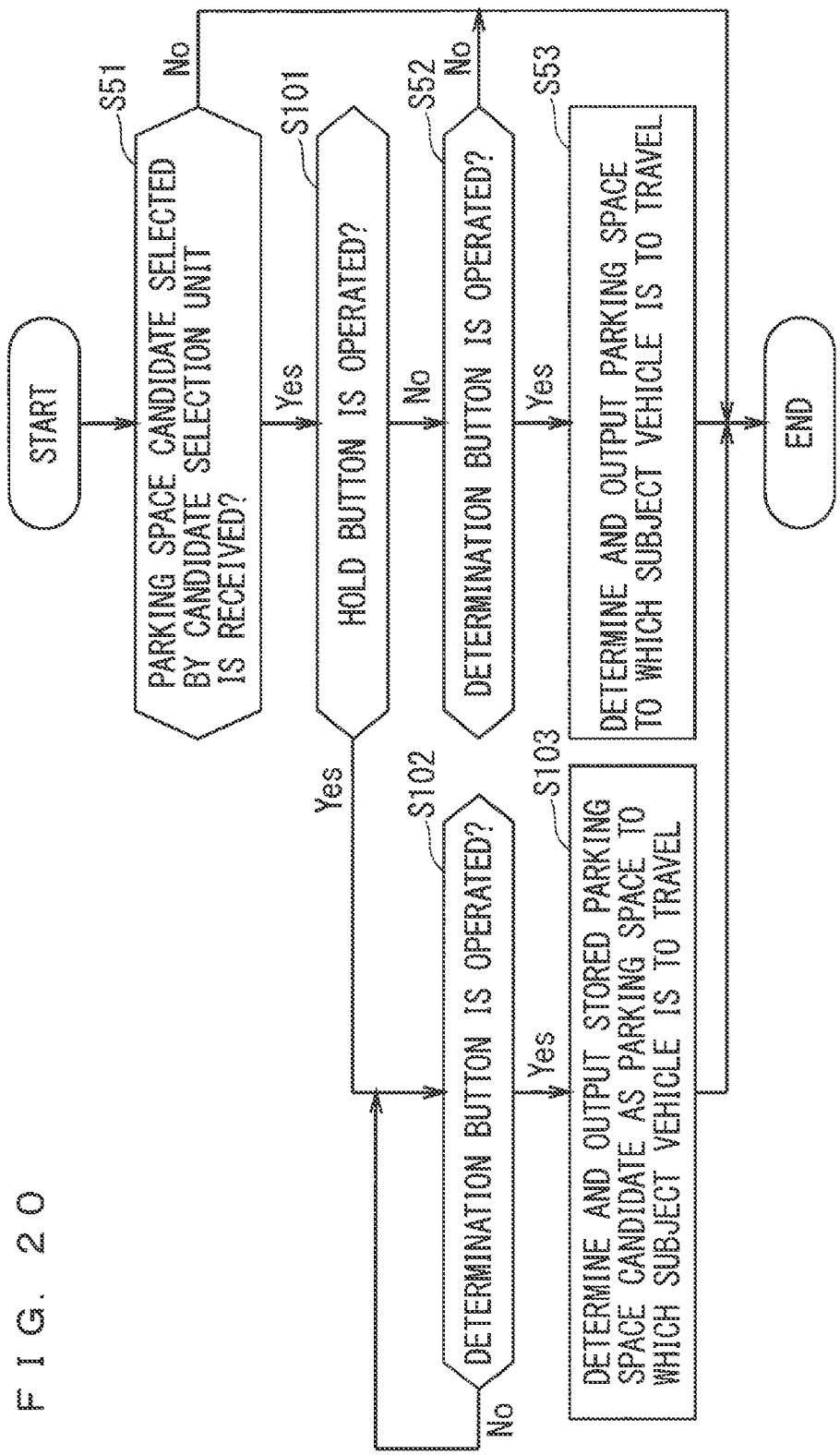
FIG. 20 A flow chart indicating an operation of a target object determination unit according to the embodiment 4.

FIG. 20 is a flow chart indicating an operation of the target object determination unit 14 according to the present embodiment 4. The same reference numerals as those described in FIG. 9 will be assigned to the similar step in FIG. 20, and the description thereof is appropriately omitted.

In Step S51, the target object determination unit 14 performs the operation similar to Step S51 in FIG. 9. In Step S51, when the target object determination unit 14 determines that the parking space candidate selected by the candidate selection unit 13 is received, the target object determination unit 14 determines in Step S101 whether or not the hold button is operated. When the target object determination unit 14 determines that the hold button is operated, the processing proceeds to Step S102, and when the target object determination unit 14 determines that the hold button is not operated, the processing proceeds to Step S52, and the operation similar to that of the embodiment 2 is performed.

When the processing proceeds from Step S101 to Step S102, the output control unit 12 may make the head-up display or the other display the stored (held) parking space candidate. When the associated information described above is stored in the storage unit 16, the output control unit 12 may make the head-up display or the other display display the associated information together with the parking space candidate.

In Step S102, the target object determination unit 14 determines whether or not the determination button is operated on the stored (held) parking space candidate. At this time, it is also applicable that the stored (held) parking space candidate cannot be held again. When the target object determination unit 14 determines that the determination button is operated, the processing proceeds to Step S103, and when the target object determination unit 14 determines that the determination button is not operated, Step S102 is repeated until the target object determination unit 14 determines that the determination button is operated.

In Step S103, the target object determination unit 14 determines the parking space candidate stored in the storage unit 16 (the held parking space candidate) as the parking space to which the subject vehicle is to travel, and outputs the determined parking space to the storage unit 16 and the automatic driving determination unit 17. Subsequently, the operation in FIG. 20 is finished.

Conclusion of Embodiment 4

According to the present embodiment 4 described above, when the predetermined operation other than the operation of the determination button is performed, the storage unit 16 stores the parking space candidate selected by the candidate selection unit 13, and when the determination button is operated after the predetermined operation, the parking space candidate stored in the storage unit 16 is determined as the parking space to which the subject vehicle is to travel. The determination of the parking space to which the subject vehicle is to travel can be thereby held. Accordingly, the driver-friendly driving assistance apparatus 1 can be achieved.

Embodiment 5

Figure 21:
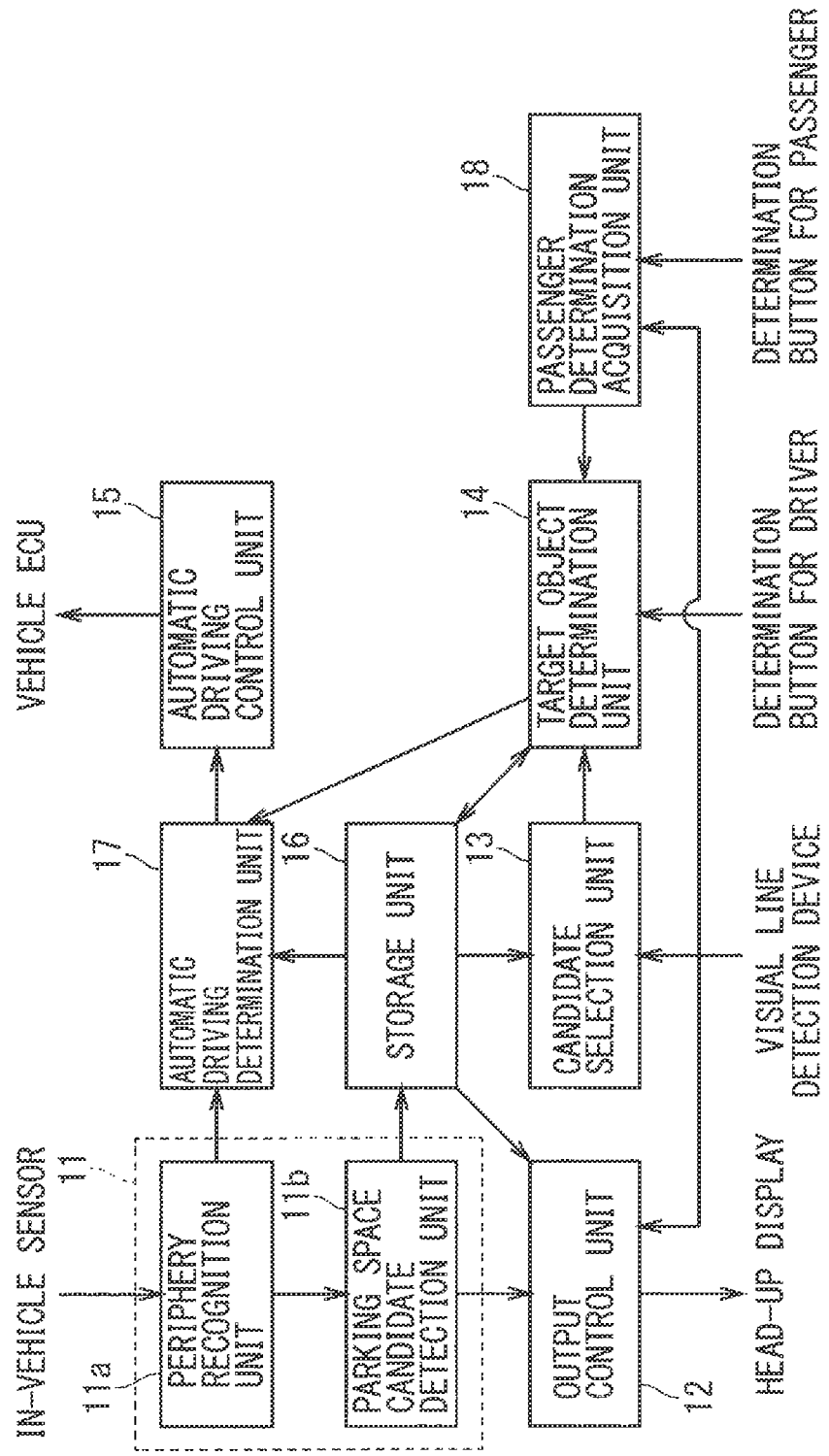
FIG. 21 A block diagram illustrating a configuration of a driving assistance apparatus according to an embodiment 5.

FIG. 21 is a block diagram illustrating a configuration of a driving assistance apparatus according to the embodiment 5 of the present invention. The same reference numerals as those described in the embodiment 2 will be assigned to the same or similar constituent element in the driving assistance apparatus 1 according to the present embodiment 5, and the different constituent elements are mainly described hereinafter.

The driving assistance apparatus 1 in FIG. 21 includes a passenger determination acquisition unit 18 in addition to the constituent element described in the embodiment 2.

<Passenger Determination Acquisition Unit 18>

The passenger determination acquisition unit 18 acquires the parking space determined by a passenger of the subject vehicle or a remote operator.

The determination of the parking space performed by the passenger is described hereinafter, however, the determination of the parking space performed by the remote operator is also operated in the similar manner. In the description hereinafter, the determination of the parking space performed by the passenger indicates that "the parking space is determined by operating a determination button which can be operated by the passenger from among the parking spaces selected based on the visual line position of the passenger". However, the determination of the parking space performed by the passenger is not limited thereto, but may be "the parking space is determined by a gesture motion of eyes of the passenger from among the parking spaces selected based on the visual line position of the passenger", for example.

The determination button which can be operated by the passenger is different from the determination button which can be operated by the driver described in the embodiment 1, for example, and is disposed in an area to be easily operated by the passenger. In the description described hereinafter, the determination button which can be operated by the passenger is referred to as "the determination button for the passenger" and the determination button which can be operated by the driver is referred to as "the determination button for the driver".

Figure 22:
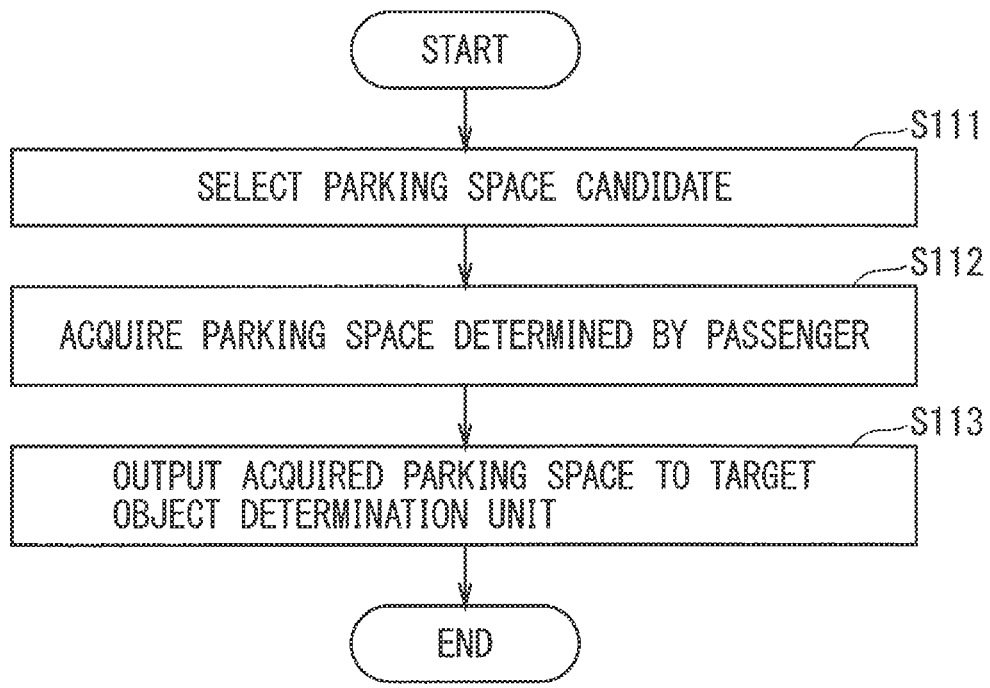
FIG. 22 A flow chart indicating an operation of a passenger determination acquisition unit according to the embodiment 5.

FIG. 22 is a flow chart indicating an operation of the passenger determination acquisition unit 18 according to the present embodiment 5.

Figure 23:
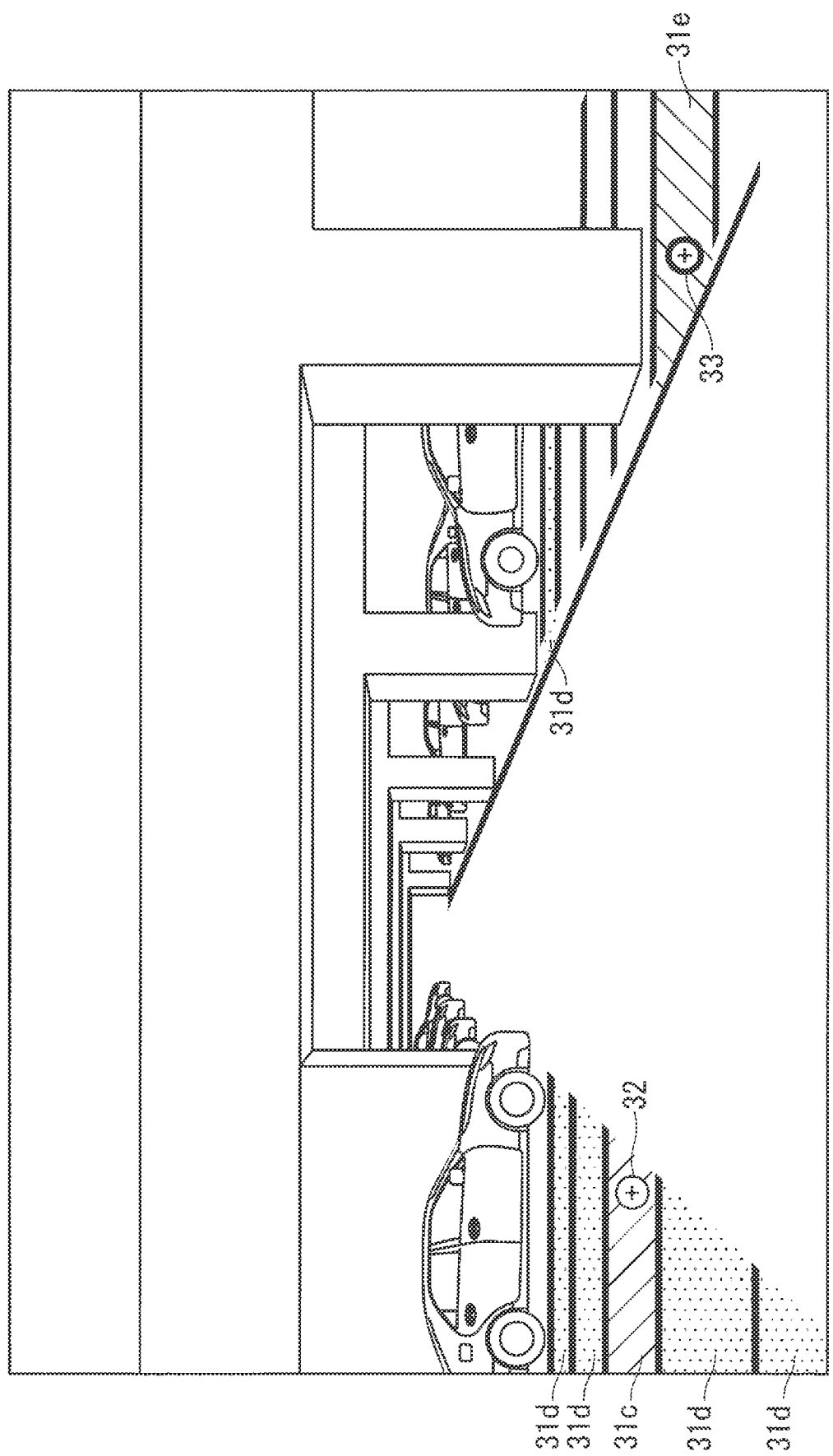
FIG. 23 A drawing illustrating a display example of a head-up display according to the embodiment 5.

In Step S11, when the passenger determination acquisition unit 18 determines, in the manner similar to the candidate selection unit 13, that the visual line position of the passenger is included in the setting range of one parking space candidate among the setting ranges of the plurality of parking space candidates, the passenger determination acquisition unit 18 selects the one parking space candidate. At this time, the output control unit 12 may make the head-up display distinguishably display the visual line position 33 of the passenger and the visual line position 32 of the driver as illustrated in FIG. 23. When the visual line position 33 of the passenger is included in a setting range 31e of one parking space candidate, the output control unit 12 may make the head-up display distinguishably display the setting range 31e of the one parking space candidate.

In Step S112, when the determination button for the passenger is operated, the passenger determination acquisition unit 18 acquires the parking space candidate selected in Step S111 as the parking space determined by the passenger of the subject vehicle in the manner similar to the target object determination unit 14.

In Step S113, the passenger determination acquisition unit 18 outputs the acquired parking space to the target object determination unit 14. Subsequently, the operation in FIG. 22 is finished.

<Target Object Determination Unit 14>

In the present embodiment 5, when the determination button for the driver is not operated, the parking space acquired by the passenger determination acquisition unit 18 is used as the parking space to be determined by the target object determination unit 14.

Figure 24:
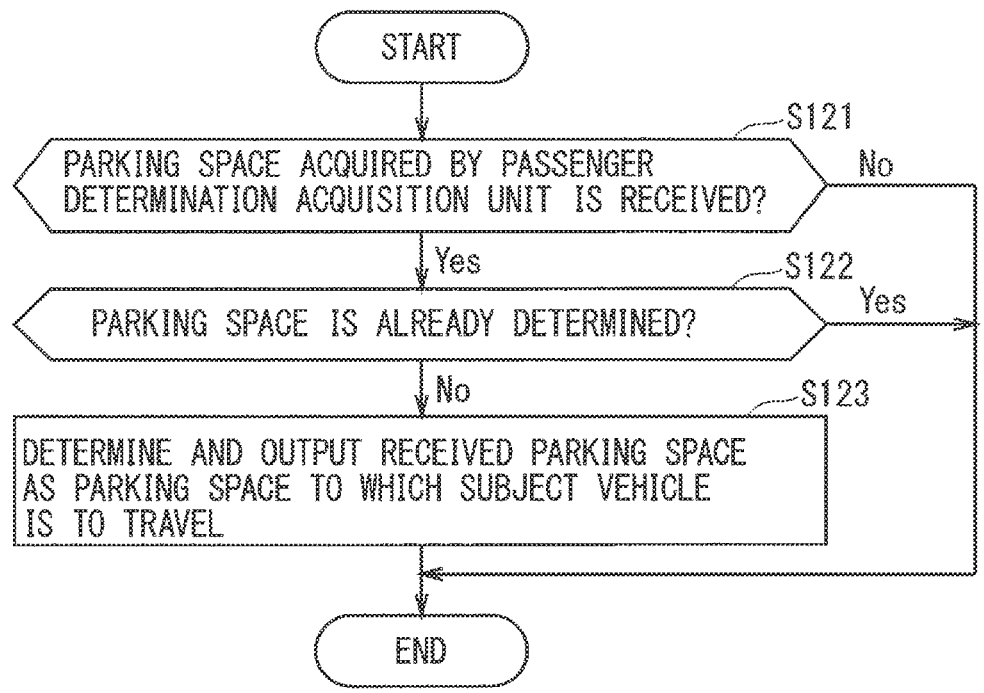
FIG. 24 A flow chart indicating an operation of a target object determination unit according to the embodiment 5.

FIG. 24 is a flow chart indicating an operation of the target object determination unit 14 according to the present embodiment 5.

In Step S121, the target object determination unit 14 determines whether or not the parking space acquired by the passenger determination acquisition unit 18 is received. When the target object determination unit 14 determines that the parking space is received, the processing proceeds to Step S122, and when the target object determination unit 14 determines that the parking space is not received, the operation in FIG. 24 is finished.

In Step S122, the target object determination unit 14 determines whether or not the parking space is stored in the storage unit 16, that is to say, whether or not the parking space is already determined by the operation of the determination button for the driver. When the target object determination unit 14 determines that the parking space is determined, the operation in FIG. 24 is finished, and when the target object determination unit 14 determines that the parking space is not determined, the processing proceeds to Step S123.

In Step S123, the target object determination unit 14 determines the parking space received in Step S121 as the parking space to which the subject vehicle is to travel, and outputs the determined parking space to the storage unit 16 and the automatic driving determination unit 17. Subsequently, the operation in FIG. 24 is finished.

Conclusion of Embodiment 5

According to the present embodiment 5 described above, when the determination button is not operated by the driver, the parking space acquired by the passenger determination acquisition unit 18 is used as the parking space to be determined by the target object determination unit 14. The load of the driver can be therefore reduced, thus the driver can concentrate on the driving, or the appropriate parking space which is not recognized by the driver can be determined.

In the description described above, when the driver already operates the determination button to determine the parking space, the determination of the parking space performed by the passenger becomes invalid. That is to say, the determination performed by the driver takes priority over the determination performed by the passenger. However, the configuration is not limited thereto, but the determination performed by the passenger may take priority over the determination performed by the driver. It is also applicable that priority is set for the persons in the subject vehicle (the driver and the passenger) to make the determination of the parking space performed by one of the driver and the passenger take priority over the determination of the other one based on the priority. At this time, a user ID determined with reference to the position of the person in the subject vehicle is used in the passenger determination acquisition unit 18, the storage unit 16, and the target object determination unit 14, for example, together with the parking space determined by the person in the subject vehicle.

Embodiment 6

Figure 25:
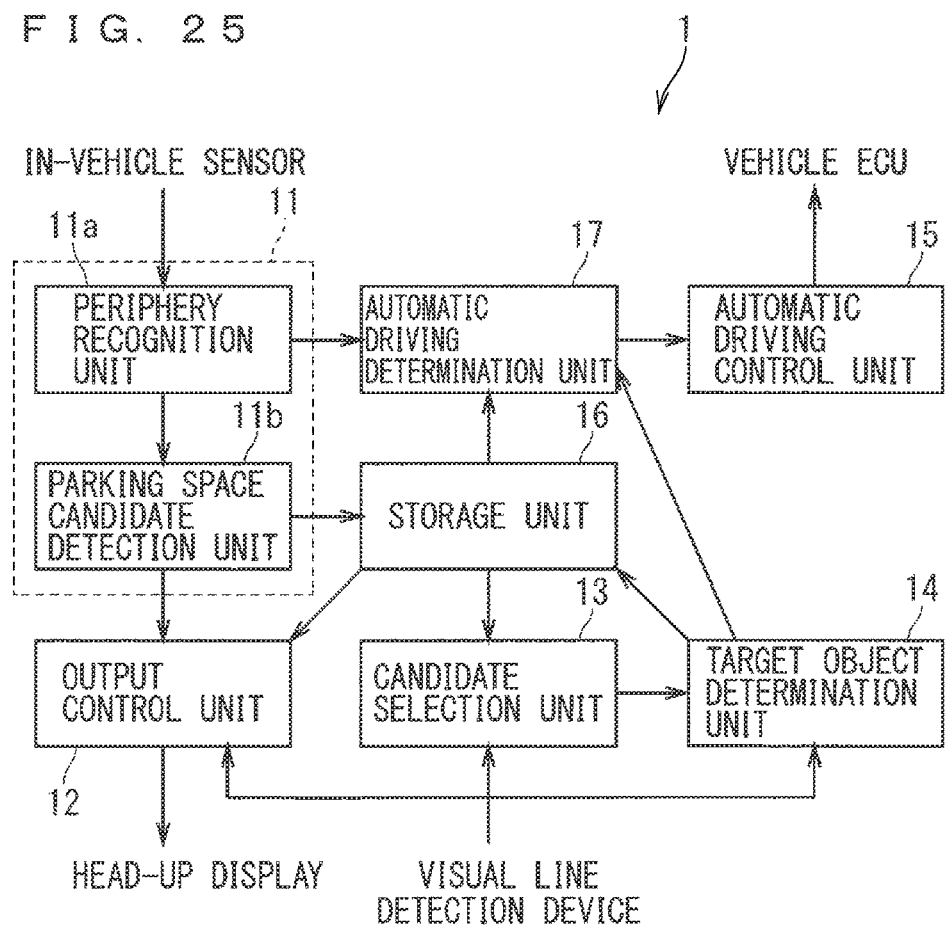
FIG. 25 A block diagram illustrating a configuration of a driving assistance apparatus according to an embodiment 6.

FIG. 25 is a block diagram illustrating a configuration of a driving assistance apparatus according to the embodiment 6 of the present invention. The same reference numerals as those described in the embodiment 2 will be assigned to the same or similar constituent element in the driving assistance apparatus 1 according to the present embodiment 6, and the different constituent elements are mainly described hereinafter.

In the embodiments 1 to 5, the parking space is determined by the operation of the determination button. In contrast, in the present embodiment 6, the parking space is determined by a gesture motion of eyes of the driver. That is to say, in the present embodiment 6, the parking space candidate is selected by the visual line position of the driver, and the parking space is determined by a gesture motion of eyes of the driver.

As the example of the above configuration, the target object determination unit 14 according to the present embodiment 6 determines whether or not the predetermined gesture motion of the eyes of the driver is performed based on the visual line information from the visual line detection device after the candidate selection unit 13 selects the parking space candidate. Then, when the target object determination unit 14 determines that the gesture has been performed, the target object determination unit 14 determines the parking space candidate selected by the candidate selection unit 13 as the parking space to which the subject vehicle is to travel.

Applied to the predetermined gesture described above is a gesture motion of the eyes which is not performed in the normal driving without intention such as a gaze for a certain period of time or longer, a blink of the eyes a certain number of times while maintaining the visual line position, for example. For example, it is applicable that the target object determination unit 14 determines that the gaze has been performed when the visual line position based on the visual line information remains in a predetermined range for a predetermined period of times or longer, and determines that the gaze has not been performed when the visual line position does not remain in the predetermined for the predetermined period of times. It is also applicable that the target object determination unit 14 determines that the blink of the eyes has been performed when the visual line position has been intermittently detected in a predetermined range for a predetermined period of times or longer, and determines that the blink of the eyes has not been performed when the visual line position has not been intermittently detected in the predetermined range for the predetermined period of times.

Conclusion of Embodiment 6

According to the present embodiment 6 having the configuration described above, the driver can intuitively select and determine the parking space to which the subject vehicle is to travel among the parking space candidates in a manner similar to the embodiment 2.

The configuration described prior to the present embodiment 6 may also be appropriately applied to the present embodiment 6. For example, when the embodiment 4 is applied to the present embodiment 6, the parking space candidate selected by the candidate selection unit 13 may be stored in the storage unit 16 in a case where a gesture of the eyes (for example, the blink of the eyes three times in a row) different from a gesture of the eyes at a time of determining the parking space (for example, the blink of the eyes twice in a row) is performed.

Embodiment 7

Figure 26:
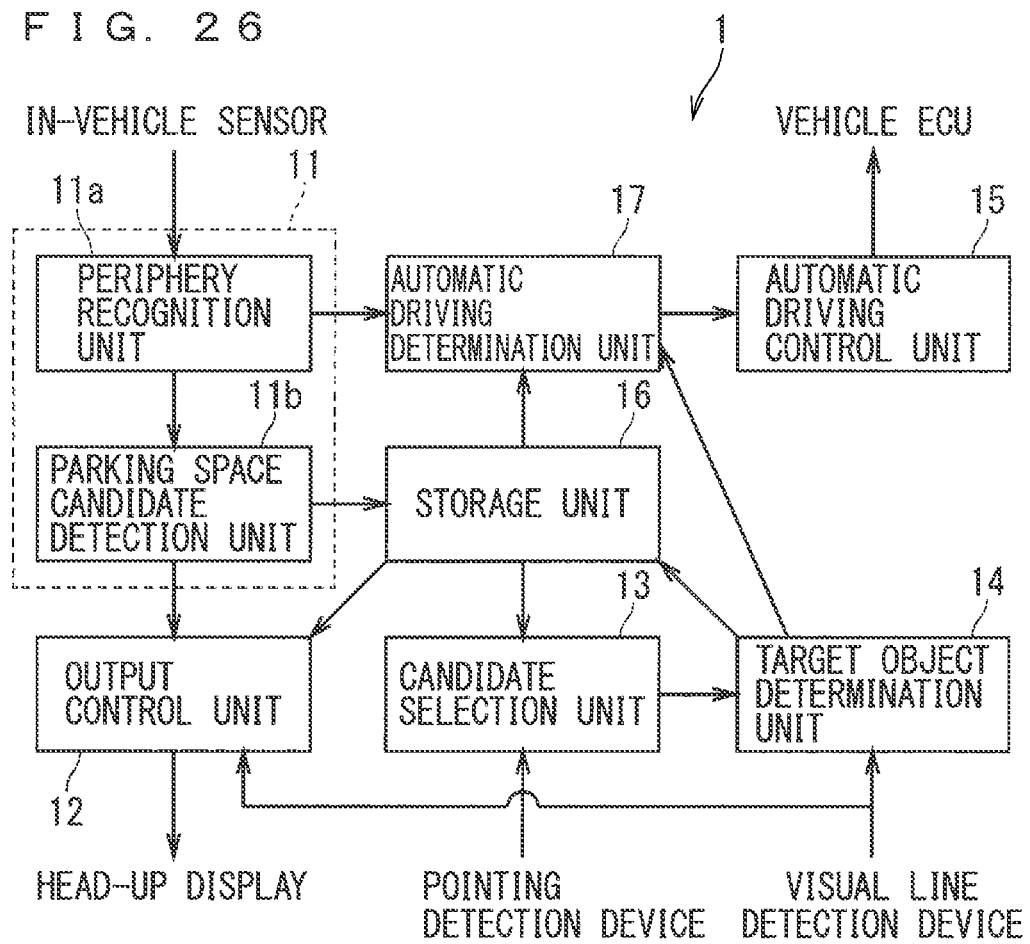
FIG. 26 A block diagram illustrating a configuration of a driving assistance apparatus according to an embodiment 7.

FIG. 26 is a block diagram illustrating a configuration of a driving assistance apparatus according to the embodiment 7 of the present invention. The same reference numerals as those described in the embodiment 6 will be assigned to the same or similar constituent element in the driving assistance apparatus 1 according to the present embodiment 7, and the different constituent elements are mainly described hereinafter.

In the embodiment 6, the parking space candidate is selected by the visual line position of the driver. In contrast, in the present embodiment 7, the parking space candidate is selected by a pointing position of the driver. That is to say, in the present embodiment 7, the parking space candidate is selected by the pointing position of the driver, and the parking space is determined by a gesture motion of eyes of the driver.

Herein, the driving assistance apparatus 1 according to the present embodiment 7 obtains pointing information regarding the pointing of the driver of the subject vehicle from a pointing detection device. A device used in Leap Motion (registered trademark) or Kinect (registered trademark), for example, is applied to the pointing detection device.

When the candidate selection unit 13 according to the present embodiment 7 determines, based on the pointing information from the pointing detection device, that the pointing position of the driver is included in the setting range of one parking space candidate among the setting ranges of the plurality of parking space candidates, the candidate selection unit 13 selects the one parking space candidate.

Conclusion of Embodiment 7

According to the present embodiment 7 having the configuration described above, the driver can intuitively select and determine the parking space to which the subject vehicle is to travel among the parking space candidates in the manner similar to the embodiment 2.

The configuration described prior to the embodiment 6 may also be appropriately applied to the present embodiment 7. For example, when the embodiment 4 is applied to the present embodiment 7, the parking space candidate selected by the candidate selection unit 13 may be stored in the storage unit 16 in the case where the gesture of the eyes (for example, the blink of the eyes three times in a row) different from the gesture of the eyes at the time of determining the parking space (for example, the blink of the eyes twice in a row) is performed.

It is also applicable that in a configuration of combining at least two of the functions in the embodiments 2, 6, and 7, one of the functions is selectively executed by the selection operation of the user. According to such a configuration, the user can determine the parking space with a favorite operation or with an operation putting less load on the driver himself/herself.

Embodiment 8

Figure 27:
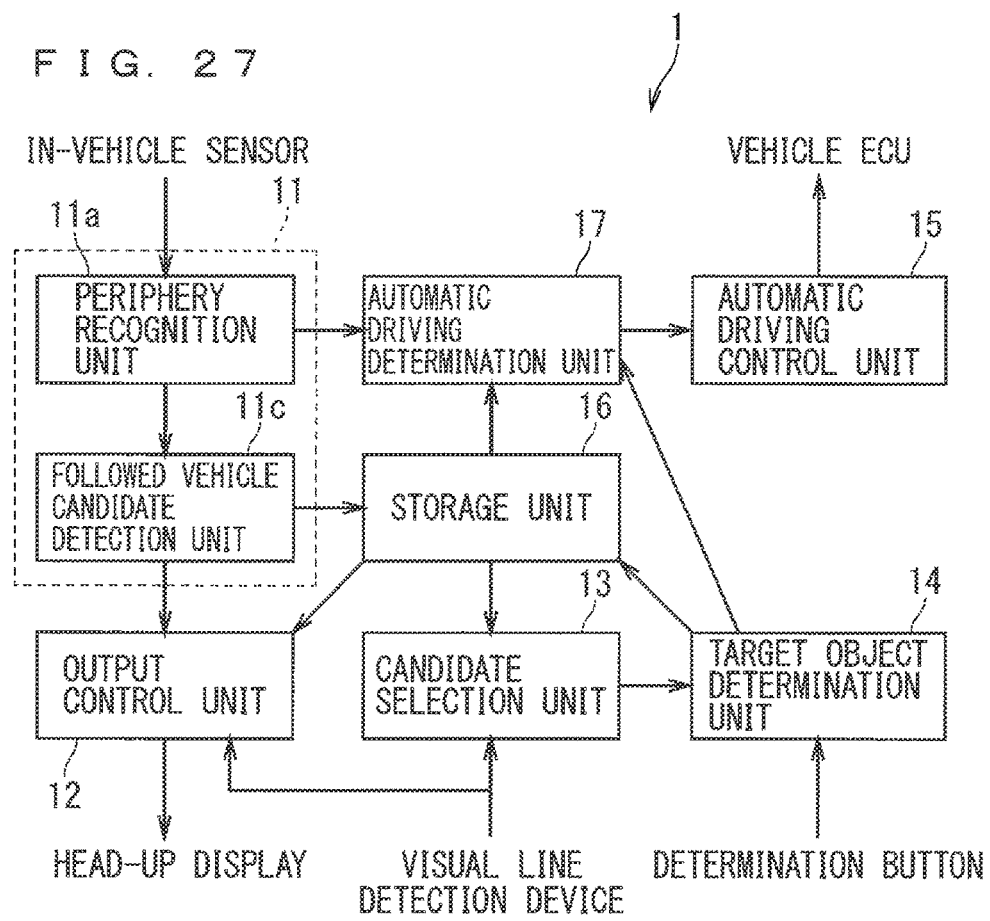
FIG. 27 A block diagram illustrating a configuration of a driving assistance apparatus according to an embodiment 8.

FIG. 27 is a block diagram illustrating a configuration of a driving assistance apparatus according to the embodiment 8 of the present invention. The same reference numerals as those described in the embodiment 2 will be assigned to the same or similar constituent element in the driving assistance apparatus 1 according to the present embodiment 8, and the different constituent elements are mainly described hereinafter.

The driving assistance apparatus 1 according to the embodiment 8 can control the automatic driving of the subject vehicle so that the subject vehicle travels to the non-vehicle which the subject vehicle is to follow (the target object to which the subject vehicle is to travel). That is to say, applied to the target object is not the parking space described in the embodiments 1 to 7 but the non-subject vehicle which the subject vehicle is to follow (referred to as "the followed vehicle" hereinafter). A vehicle in front of the subject vehicle, for example, is applied to the followed vehicle.

A followed vehicle detection unit 11c has a configuration similar to the parking space candidate detection unit 11b described above except that the detection object is changed from the parking space to the followed vehicle. The other constituent element such as the candidate selection unit 13 is similar to that described above except that the object is changed from the parking space to the followed vehicle.

Figure 28:
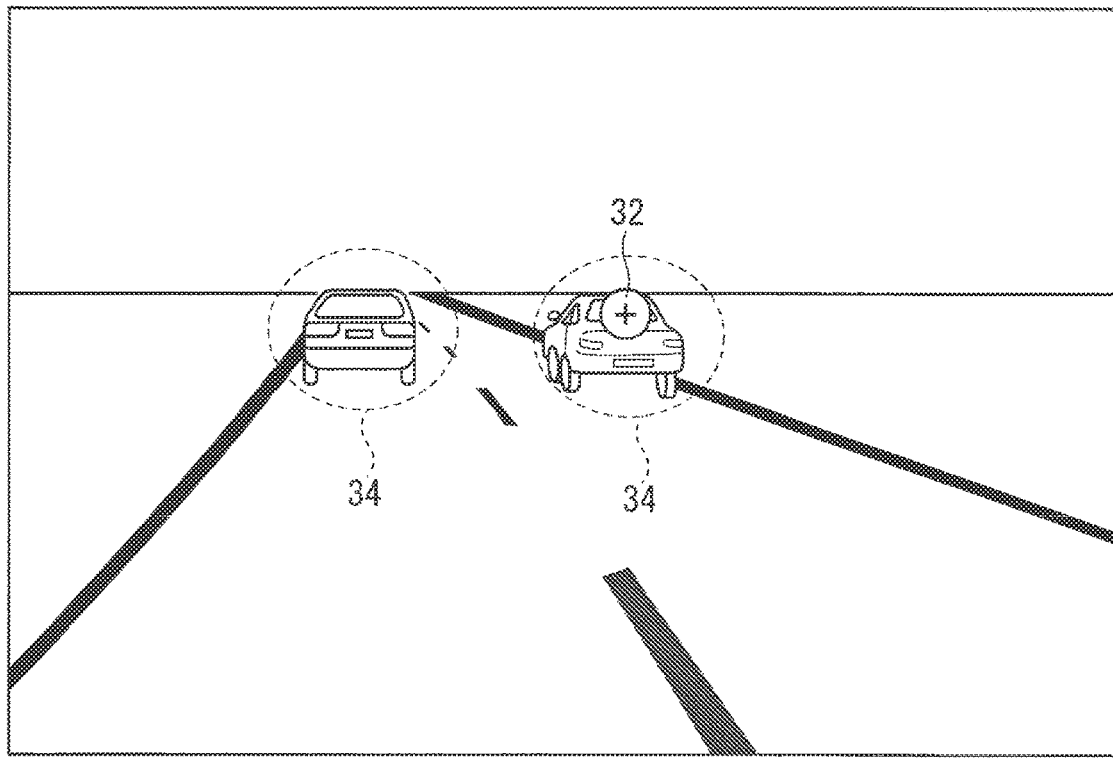
FIG. 28 A drawing illustrating a display example of a head-up display according to the embodiment 8.

FIG. 28 is a drawing illustrating a display example of a head-up display according to the present embodiment 8. In FIG. 28, a setting range 34 of a candidate for the followed vehicle is distinguishably displayed by the broken lines.

When the visual line position 32 of the driver is included in the setting range 34 of one followed vehicle candidate among the setting ranges 34 of a plurality of followed vehicle candidates (the candidates for the followed vehicle), the candidate selection unit 13 selects the one followed vehicle candidate. Then, when the determined button is operated after the followed vehicle candidate is selected by the candidate selection unit 13, the target object determination unit 14 determines the followed vehicle candidate selected by the candidate selection unit 13 as the followed vehicle to which the subject vehicle is to travel.

Conclusion of Embodiment 8

According to the present embodiment 8 having the configuration described above, the driver can intuitively select and determine the followed vehicle to which the subject vehicle is to travel among the followed vehicle candidates. When the automatic driving of the subject vehicle is the complete automatic driving, the selection and the determination described above can be performed without temporarily performing an override to switch the driving mode to a manual driving, changing a lane, or deviating the visual line from a front side.

Other Modification Example

The candidate acquisition unit 11, the output control unit 12, the candidate selection unit 13, and the target object determination unit 14 (referred to as the "the candidate acquisition unit 11 etc." hereinafter) in the driving assistance apparatus 1 is achieved by a processing circuit 91 illustrated in FIG. 29. That is to say, the processing circuit 91 includes; the candidate acquisition unit 11 which acquires the target object candidate, which is the candidate for the target object to which the vehicle is to travel and detected based on the periphery information regarding the periphery of the vehicle; the output control unit 12 which makes the head-up display, which is mounted on the vehicle, display the setting range being set for each of the plurality of target object candidates acquired by the candidate acquisition unit 11; the candidate selection unit 13 which selects one target object candidate when the candidate selection unit 13 determines, based on the visual line information regarding the visual line of the driver of the vehicle, that the visual line position of the driver is included in the setting range of the one target object candidate among the setting ranges of the plurality of target object candidates; and the target object determination unit 14 which determines the target object candidate selected by the candidate selection unit 13 as the target object when the determination button which can be operated by the driver is operated after the candidate selection unit 13 selects the target object candidate, and outputs the determined target object to the automatic driving control unit. Dedicated hardware may be applied to the processing circuit 91, and a processor for executing a program stored in a memory (a CPU, a central processing device, a processing unit, an arithmetic unit, a microprocessor, a microcomputer, and a digital signal processor) may be applied to the processing circuit 91.

When the processing circuit 91 is the dedicated hardware, a single circuit, a complex circuit, a programmed processor, a parallel-programmed processor, an ASIC, a FPGA, or a combination of them, for example, falls under the processing circuit 91. Each function of the candidate acquisition unit 11 etc. may be achieved by the plurality of processing circuits 91, or each function of them may also be collectively achieved by one processing circuit 91.

When the processing circuit 91 is the processor, the functions of the candidate acquisition unit 11 etc. are achieved by a combination with software (software, firmware, or software and firmware), for example. The software, for example, is described as a program and is stored in a memory. A processor 92 applied to the processing circuit 91 reads out and executes a program stored in a memory 93, thereby achieving the function of each unit, as illustrated in FIG. 30. That is to say, the driving assistance apparatus 1 includes the memory 93 to store the program to resultingly execute, at a time of being executed by the processing circuit 91, steps of: acquiring the target object candidate, which is the candidate for the target object to which the vehicle is to travel and detected based on the periphery information regarding the periphery of the vehicle; making the head-up display, which is mounted on the vehicle, display the setting range being set for each of the plurality of acquired target object candidates; selecting one target object candidate when it is determined, based on the visual line information regarding the visual line of the driver of the vehicle, that the visual line position of the driver is included in the setting range of the one target object candidate among the setting ranges of the plurality of target object candidates; determining the selected target object candidate as the target object when the determination button which can be operated by the driver is operated after the target object candidate is selected, and outputting the determined target object to the automatic driving control unit. In other words, this program is also deemed to make a computer execute a procedure or a method of the candidate acquisition unit 11 etc. Herein, a non-volatile or volatile semiconductor memory such as a RAM (Random Access Memory), a ROM (Read Only Memory), a flash memory, an EPROM (Erasable Programmable Read Only Memory), or an EEPROM (Electrically Erasable Programmable Read Only Memory), an HDD (Hard Disk Drive), a magnetic disc, a flexible disc, an optical disc, a compact disc, a mini disc, a DVD (Digital Versatile Disc), or a drive device of them, for example, falls under the memory 93.

Described above is the configuration that each function of the candidate acquisition unit 11 etc. is achieved by one of the hardware and the software, for example. However, the configuration is not limited thereto, but also applicable is a configuration of achieving a part of the candidate acquisition unit 11 etc. by dedicated hardware and achieving another part of them by software, for example.

As described above, the processing circuit 91 can achieve each function described above by the hardware, the software, or the combination of them, for example. Although the storage units 16 are made up of the memory 93, they may be made up of one memory 93 or each of them may also be made up of the individual memory 93.

The driving assistance apparatus described above can be applied to a driving assistance system constructed as a system by appropriately combining navigation device or a Portable Navigation Device which can be mounted on the vehicle, a communication terminal (a portable terminal such as a mobile phone, a smartphone, or a tablet, for example), a function of an application installed on them, and a server, for example. In the above case, each function or each constituent element of the driving assistance apparatus described above or each function or each constituent element of a periphery device thereof may be dispersedly disposed in each device constructing the system described above, or may also be collectively disposed in one of the devices.

According to the present invention, each embodiment and modification example can be arbitrarily combined, or each embodiment and modification example can be appropriately varied or omitted within the scope of the invention.

The present invention has been shown and described in detail, the foregoing description is in all aspects illustrative and not restrictive. It is therefore understood that numerous modifications and variations can be devised without departing from the scope of the invention.

EXPLANATION OF REFERENCE SIGNS

1 driving assistance apparatus, 11 candidate acquisition unit, 12 output control unit, 13 candidate selection unit, 14 target object determination unit, 16 storage unit, 18 passenger determination acquisition unit, 31, 31a, 31b, 31c, 31d, 31e, 34 setting range, 32 visual line position, 91 processing circuit, 92 processor, 93 memory

The invention claimed is:

1. A driving assistance apparatus for assisting a driving of a vehicle which is capable of performing an automatic driving, comprising:
   a processor to execute a program; and
   a memory to store the program which, when executed by the processor, performs processes of,
   performing a candidate acquisition process which acquires at least one target object candidate, where each candidate is a candidate for a target object to which the vehicle is to travel and detected based on periphery information regarding a periphery of the vehicle;
   performing an output control process which makes a head-up display mounted on the vehicle display a setting range for each of the target object candidates acquired by the candidate acquisition process;
   performing a candidate selection process which selects one target object candidate when it is determined, based on visual line information regarding a visual line of the driver of the vehicle, that a visual line position of the driver is included in the setting range of the selected one target object candidate among the setting ranges of the target object candidates; and
   performing a target object determination process which determines the target object candidate selected by the candidate selection process as the target object when a determination button which can be operated by the driver is operated after the candidate selection process selects the selected target object candidate, wherein
   the target object determination process outputs the determined target object to an automatic driving control process which can control the automatic driving of the vehicle so that the vehicle travels to the determined target object, and
   the output control process changes a display mode of the setting range of the target object candidate displayed by the head-up display based on a timing of acquiring the target object candidate in the candidate acquisition process.

2. The driving assistance apparatus according to claim 1, further comprising
   a storage which stores the visual line position of the driver based on the visual line information when the determination button is operated before the selection of a target object candidate by the candidate selection process, wherein when the visual line position stored in the storage is included in the setting range of target object candidate acquired by the candidate acquisition process after the determination button is operated, the target object candidate, acquired by the candidate acquisition process after the determination button is operated, is used as the target object to be determined by the target object determination process.

3. The driving assistance apparatus according to claim 1, wherein
the output control process makes the head-up display distinguishably display the visual line position of the driver.

4. The driving assistance apparatus according to claim 1, wherein
when the visual line position of the driver is included in the setting range of the one target object candidate acquired by the candidate acquisition process, the output control process makes the head-up display distinguishably display the setting range of the one target object candidate and the setting ranges of the target object candidates other than the one target object candidate depending on the presence of a mark.

5. The driving assistance apparatus according to claim 1, wherein
the output control process makes an audio output device mounted on the vehicle output audio when the output control process changes a display mode of a target object candidate displayed by the head-up display.

6. The driving assistance apparatus according to claim 1, wherein
the output control process controls an audio output of a plurality of audio output devices mounted on the vehicle based on a position of the target object candidate which has been acquired by the candidate acquisition process most recently.

7. The driving assistance apparatus according to claim 1, wherein
the output control process makes the head-up display display the setting range of the target object candidate which is not detected based on the periphery information generated in the vehicle but detected based on the periphery information generated outside the vehicle.

8. The driving assistance apparatus according to claim 1, further comprising
a storage which stores, when a predetermined operation other than an operation of the determination button is performed after the target object candidate is selected by the candidate selection process, the target object candidate selected by the candidate selection process, wherein
when the determination button is operated after the predetermined operation, the target object determination process determines the target object candidate stored in the storage as the target object.

9. The driving assistance apparatus according to claim 1, wherein the program, when executed by the processor, further performs processes of,
a passenger determination acquisition process which acquires the target object determined by a passenger of the vehicle or a remote operator, wherein
when the determination button is not operated, the target object which is acquired by the passenger determination acquisition process is used as the target object to be determined by the target object determination process.

10. The driving assistance apparatus according to claim 1, wherein the target object includes a parking space in which the vehicle is to be parked or another vehicle which the vehicle is to follow.

11. The driving assistance apparatus according to claim 1, wherein
the target object determination process further determines the target object candidate selected by the candidate selection process as the target object when it is determined, based on the visual line information, that a predetermined gesture motion of eyes of the driver is performed after the candidate selection process selects the target object candidate.

12. The driving assistance apparatus according to claim 1, the output control process displays the setting range of a first target object candidate and the setting range of a second target object candidate, the second target object candidate being acquired in the candidate acquisition process at a timing different from the first target object candidate, in different display modes in association with a real object of the first target object candidate and a real object of the second target object candidate, respectively.

13. A driving assistance apparatus for assisting a driving of a vehicle which is capable of performing an automatic driving, comprising:
a processor to execute a program; and
a memory to store the program which, when executed by the processor, performs processes of,
performing a candidate acquisition process which acquires at least one target object candidate, where each candidate is a candidate for a target object to which the vehicle is to travel and detected based on periphery information regarding a periphery of the vehicle;
performing an output control process which makes a head-up display mounted on the vehicle display a setting range for each of the target object candidates acquired by the candidate acquisition process;
performing a candidate selection process which selects one target object candidate when it is determined, based on pointing information regarding a pointing of the driver of the vehicle, that a pointing position of the driver is included in the setting range of the selected one target object candidate among the setting ranges of the target object candidates; and
performing a target object determination process which determines the target object candidate selected by the candidate selection process as the target object when it is determined, based on the visual line information regarding a visual line of the driver of the vehicle, that a predetermined gesture motion of eyes of the driver is performed after the candidate selection process selects the selected target object candidate, wherein
the target object determination process outputs the determined target object to an automatic driving control process which can control the automatic driving of the vehicle so that the vehicle travels to the determined target object.

14. A driving assistance apparatus for assisting a driving of a vehicle which is capable of performing an automatic driving, comprising:
a processor to execute a program; and
a memory to store the program which, when executed by the processor, performs processes of,
performing a candidate acquisition process which acquires at least one target object candidate, where each candidate is a candidate for a target object to which the vehicle is to travel and detected based on periphery information regarding a periphery of the vehicle;

performing an output control process which makes a head-up display mounted on the vehicle display a setting range for each of the target object candidates acquired by the candidate acquisition process; and performing a passenger determination acquisition process which selects one target object candidate when it is determined, based on visual line information regarding a visual line of a passenger of the vehicle or a remote operator, that a visual line position of the passenger of the vehicle or the remote operator is included in the setting range of a selected target object among the setting ranges of the target object candidates, and acquires the selected target object candidate as the target object to be determined by a target object determination process when a determination button which can be operated by the passenger of the vehicle or the remote operator is operated, wherein the target object determination process outputs the determined target object to an automatic driving control process which can control the automatic driving of the vehicle so that the vehicle travels to the determined target object.

* * * * *